US010929815B2

(12) United States Patent
Martin et al.

(10) Patent No.: US 10,929,815 B2
(45) Date of Patent: Feb. 23, 2021

(54) ADAPTIVE AND REUSABLE PROCESSING OF RETROACTIVE SEQUENCES FOR AUTOMATED PREDICTIONS

(71) Applicant: BUILDGROUP DATA SERVICES INC., Austin, TX (US)

(72) Inventors: Francisco J. Martin, Corvallis, OR (US); Luis Javier Placer Mendoza, Madrid (ES); Alvaro Otero Perez, Valencia (ES); Javier S. Alperte Pérez Rejón, Barcelona (ES); Xavier Canals Orriols, Valencia (ES); Francisco J. Garcia Moreno, Valencia (ES); Jim Shur, Corvallis, OR (US); Candido Zuriaga Garcia, Valencia (ES)

(73) Assignee: BUILDGROUP DATA SERVICES INC., Austin, TX (US)

( * ) Notice: Subject to any disclaimer, the term of this patent is extended or adjusted under 35 U.S.C. 154(b) by 953 days.

(21) Appl. No.: 15/458,931

(22) Filed: Mar. 14, 2017

(65) Prior Publication Data

US 2017/0262757 A1    Sep. 14, 2017

Related U.S. Application Data

(60) Provisional application No. 62/307,918, filed on Mar. 14, 2016, provisional application No. 62/308,095, filed on Mar. 14, 2016.

(51) Int. Cl.
*G06N 5/02* (2006.01)
*G06Q 10/10* (2012.01)
(Continued)

(52) U.S. Cl.
CPC .......... *G06Q 10/105* (2013.01); *G06N 5/022* (2013.01); *G06N 5/04* (2013.01); *G06N 20/00* (2019.01); *G06Q 10/06* (2013.01); *G06Q 10/067* (2013.01)

(58) Field of Classification Search
CPC .... G06Q 10/105; G06Q 10/06; G06Q 10/067; G06N 20/00; G06N 5/022; G06N 5/04
(Continued)

(56) References Cited

U.S. PATENT DOCUMENTS 8,321,321 B2    11/2012   Jagarlapudi
8,554,709 B2    10/2013   Goodson
(Continued)

FOREIGN PATENT DOCUMENTS

WO    3067374    8/2003

OTHER PUBLICATIONS

Oliver et al, Coupled hidden Markov models for complex action recognition, 1997, CVPR97 (Year: 1997).*
(Continued)

*Primary Examiner* — Brandon S Cole
(74) *Attorney, Agent, or Firm* — Schwabe, Williamson & Wyatt, P.C.

(57) ABSTRACT

Systems and methods for predicting the outcome of a business entity are presented. In embodiments, a system may receive explicit data reporting or indicating activities of a business entity, and other data from which information regarding the activities or level of operations of the entity may be inferred. Using one or more data processors, the system may generate inferred data regarding the business entity from a selected portion of the other data, and use at least some of the explicit data and the inferred data to determine which one of a series of defined sequential active states of development the entity currently is in. The system
(Continued)

Example CHMM with 5 hidden states, 4 final states, and 1 active state may further, using the result of the determination as the current state of the business, predict a final stage of the business entity, and a probability of evolving to that final stage from the current state. Other embodiments may be disclosed or claimed.

7 Claims, 28 Drawing Sheets

(51) Int. Cl.
*G06F 16/23* (2019.01)
*G06N 20/00* (2019.01)
*G06Q 10/06* (2012.01)
*G06N 5/04* (2006.01)

(58) Field of Classification Search
USPC .................................................. 706/1–62
See application file for complete search history.

(56) References Cited

U.S. PATENT DOCUMENTS

| | | | |
|---|---|---|---|
| 9,269,054 | B1 | 2/2016 | Martin |
| 10,361,802 | B1* | 7/2019 | Hoffberg-Borghesani ................ G11B 27/11 |
| 2002/0138385 | A1 | 9/2002 | Milam |
| 2003/0208397 | A1* | 11/2003 | VanDusen .......... G06Q 30/0275 705/14.27 |
| 2003/0236677 | A1 | 12/2003 | Casati |
| 2006/0111931 | A1 | 5/2006 | Johnson |
| 2009/0234660 | A1 | 9/2009 | Berneman |
| 2011/0213211 | A1 | 9/2011 | Stevens et al. |
| 2012/0041772 | A1 | 2/2012 | Ebadollahi |
| 2013/0097059 | A1* | 4/2013 | Bonner .............. G06Q 30/0201 705/35 |
| 2014/0012780 | A1 | 1/2014 | Sanders |
| 2014/0025442 | A1 | 1/2014 | Goodson et al. |
| 2014/0278754 | A1* | 9/2014 | Cronin ................ G06F 16/2453 705/7.29 |
| 2014/0289098 | A1* | 9/2014 | Walzak ................ G06Q 40/025 705/38 |
| 2015/0095080 | A1 | 4/2015 | Gatti |
| 2015/0161567 | A1 | 6/2015 | Mondal et al. |
| 2015/0294257 | A1 | 10/2015 | Raza |
| 2015/0324454 | A1 | 11/2015 | Roberts et al. |
| 2015/0332169 | A1 | 11/2015 | Bivens |
| 2015/0347917 | A1 | 12/2015 | Hua |
| 2015/0379454 | A1 | 12/2015 | Polli et al. |
| 2016/0196511 | A1 | 7/2016 | Anisingaraju et al. |
| 2016/0203433 | A1 | 7/2016 | Chen et al. |
| 2016/0224896 | A1 | 8/2016 | Pinel et al. |
| 2017/0200006 | A1* | 7/2017 | Gershoni .............. G06Q 10/06 |
| 2017/0262809 | A1* | 9/2017 | Martin .................... G06N 20/00 |

OTHER PUBLICATIONS

United States Patent Office; Office Action issued for U.S. Appl. No. 15/458,796 dated Jun. 27, 2019; 60 pages.
Visintin, et al.; "Founding team composition and early performance of university-Based spin-off companies," Technovation 34.1 (2014): 31-43 (Year: 2013); 13 pages.
Bensic, et al.; "Modelling small-business credit scoring by using logistic regression, neural networks and decision trees," Intelligent Systems in Accounting, Finance & Management: International Journal 113 (2005): 133-150 (Year: 2005); 18 pages.
"Basic Data Types," by R Tutorial archived Jan. 10, 2015; available at https://web.archive.org/web/20150110001024/https://www.cyclismo.org/tutorial/R/types.html (Year: 2015); 7 pages.
Zhong, Shi; "A New Formulation of Coupled Hidden Markov Models"; Jun. 2001; University of Texas at Austin; 19 Pages.
European Patent Office; International Search Report and Written Opinion for PCT/US2017/022353; Rijswijk, NL; dated May 3, 2017, 13 pages.
Akdere, M., Combining Proactive and Retroactive Processing for Distributed Complex Event Detection, RI: Brown University, 2007; 12 pages.
Bell, C. Gordon, High-Tech Ventures: The Guide for Entrepreneurial Success; Copyright 1991, Addison-Wesley Publishing Company, Inc.; ISBN 0201-56321-5.
Demaine, E. D., J. Iacono, and S. Langerman, "Retroactive Data Structures", Trans. On Algorithms, vol. 3, 2007; 21 Pages.
Etzion, O., A. Gall, and A. Segev, "Retroactive and proactive database processing", Proc. Fourth Intl. Workshop on Research Issues in Data Engineering: Active Database Systems, 1994. pp. 126-131.
Krishnamurthy, A., CARDS: Conjoint Adaptive Retroactive Database System. MS Thesis, Massachusetts Institutes of Technology, 2002, 62 Pages.
Desai, R., Predicting Startup Success; Jul. 10, 2014; online; blog.bigml.com: http://blog.bigml.com/2014/07/10/predicting-startup-success.
Edholm A., Fazzino S., Kumar S., Wright K., Vidore L.; "Predicting Start-Up Round Funding"; Sep. 13, 2015; available at www.youtube.co; online https://www.youtube.co/watch=vjrms8a0yF-U.
Gilbert,A.; "Silicon Valey's Dirty Secret"; Jul. 2015; online at Medium.com; https://medium.com/@arlogilbert/silicon-valley-s-dirty-secret-67b1f0efdce#.6se4hyc7v.
Guzman, A. Stern S.; "Where is Silicon Valley? Forecasting and Mapping Entrepreneurial Quality"; Science, 347:606-609; Feb. 2015; 6 pages.
Hardy Q.;"Using Algorithms to Determine Character"; New York Times; Jul. 26, 2015; 4 pages.
Kardashian, K.; "Could Algorithms Help Create a Better Venture Capitalist?": Fortune.com; Aug. 2015; online: https://fortune.co/2015/08/05/venture-capital-hits-average.pdf.
Lerman A C.; "Patent Strategies of Technology Startups: An Empirical Study"; online SSRN: http://ssrn.com/abstract=2610433; 63 Pages.
Taylor J.; "V.C. Firm Names Robot to Board of Directors"; May 2014; online Observer; http://observer.com/2014/v-c-firm-names-robot-to-board-of-directors; 2 Pages.
European Patent Office; International Search Report and Written Opinion for PCT/US2017/022373; Rijswijk, NL; dated May 18, 2017, 13 pages.
European Patent Office; International Search Report and Written Opinion for PCT/US2017/022353; Rijswijk, NL; dated May 3, 2017, 12 pages.
United States Patent Office; Final Office Action issued for U.S. Appl. No. 15/458,796 dated Apr. 16, 2020; 33 pages.

* cited by examiner

Figure 1 – Limited number of states used to subsume a large number of individual events Figure 2 – Example CHMM with 5 hidden states, 4 final states, and 1 active state Figure 3 – High-level View of System and Methods Set of jobs, contexts, code and templates to import, transform and generate a CSV ready to model Extend companies with additional data Generation of on_exit previous years metrics Generation of team, roles and twitter metrics Output dataset 2110
Score
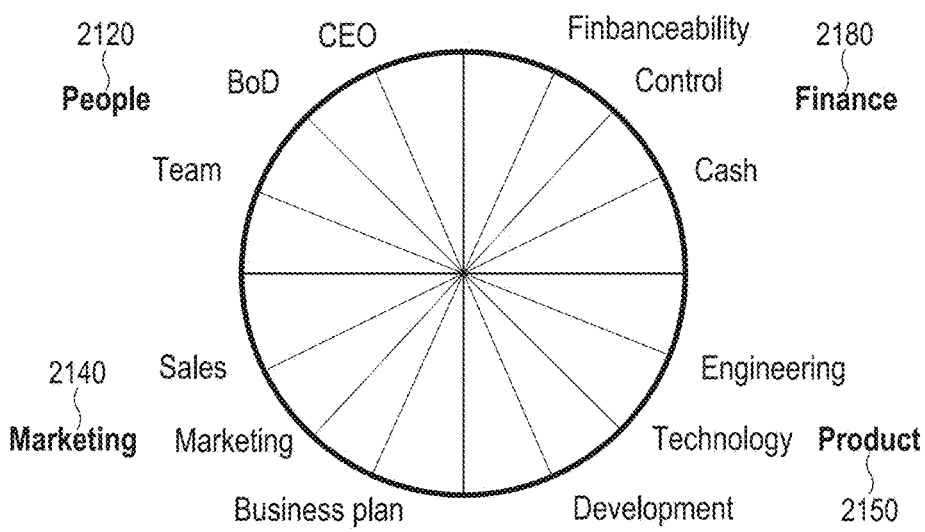
*Bell-Mason Diagnostic
Approach
Automatically reconstruct the story of thousands of companies and classify them
For any new company, identify its current state and predict the probability to move to a new stage / status
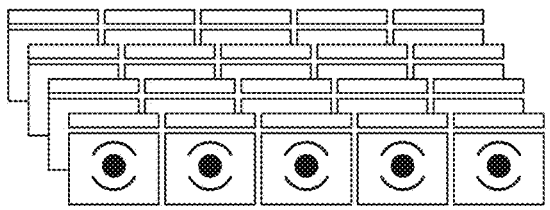
FIG. 21

NOTE MUTABLE LIKELY NOT BINARY BUT VALUE 0-1

*preseries*

US 10,929,815 B2

ADAPTIVE AND REUSABLE PROCESSING OF RETROACTIVE SEQUENCES FOR AUTOMATED PREDICTIONS

PRIORITY

This application is a non-provisional of and claims priority benefit to each of U.S. Provisional Patent Application 62/307,918, filed on Mar. 14, 2016, and U.S. Provisional Patent Application No. 62/308,095, filed on Mar. 14, 2016, both of which are incorporated herein by reference in their entirety.

COPYRIGHT NOTICE

© 2016 PreSeries Tech, SL. A portion of the present disclosure may contain material that is subject to copyright protection. The copyright owner has no objection to the facsimile reproduction by anyone of the present disclosure, as it appears in the Patent and Trademark Office patent file or records, but otherwise reserves all copyright rights whatsoever.

TECHNICAL FIELD

The present disclosure relates to the field of database creation and use, in particular, to systems for inferring an active state of a company from a variety of data sources, predicting a final state that the company will likely evolve to from the current active state, and the probability of evolving to such a final state, and associated methods or computer readable storage media.

BACKROUND

Early-stage investors in companies are often characterized as following one of a "gut-driven", "term-driven" or "lemming-like" approach. Gut-driven investors primarily follow their instincts about specific companies in making decisions. Term-driven focus on maximizing potential returns by focusing on companies that offer better financial terms than others. Lemming-like investors tend to let others identify promising opportunities and follow them, frequently co-investing in companies that others feel are promising. Neither of these approaches involve a detailed, quantified basis for decision making.

It would be advantageous to have a technical tool for evaluating investment opportunities to identify those which are likely to be more successful than others. Such a tool would allow an investor to evaluate startups early in their evolution and to predict the success they are likely to achieve.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the figures of the accompanying drawings.

FIG. 21 illustrates a screen from an exemplary software environment illustrating in detail various components of a final score, and a sampling of a set of scores generated using these components, in accordance with various embodiments.

SUMMARY

Figure 1:
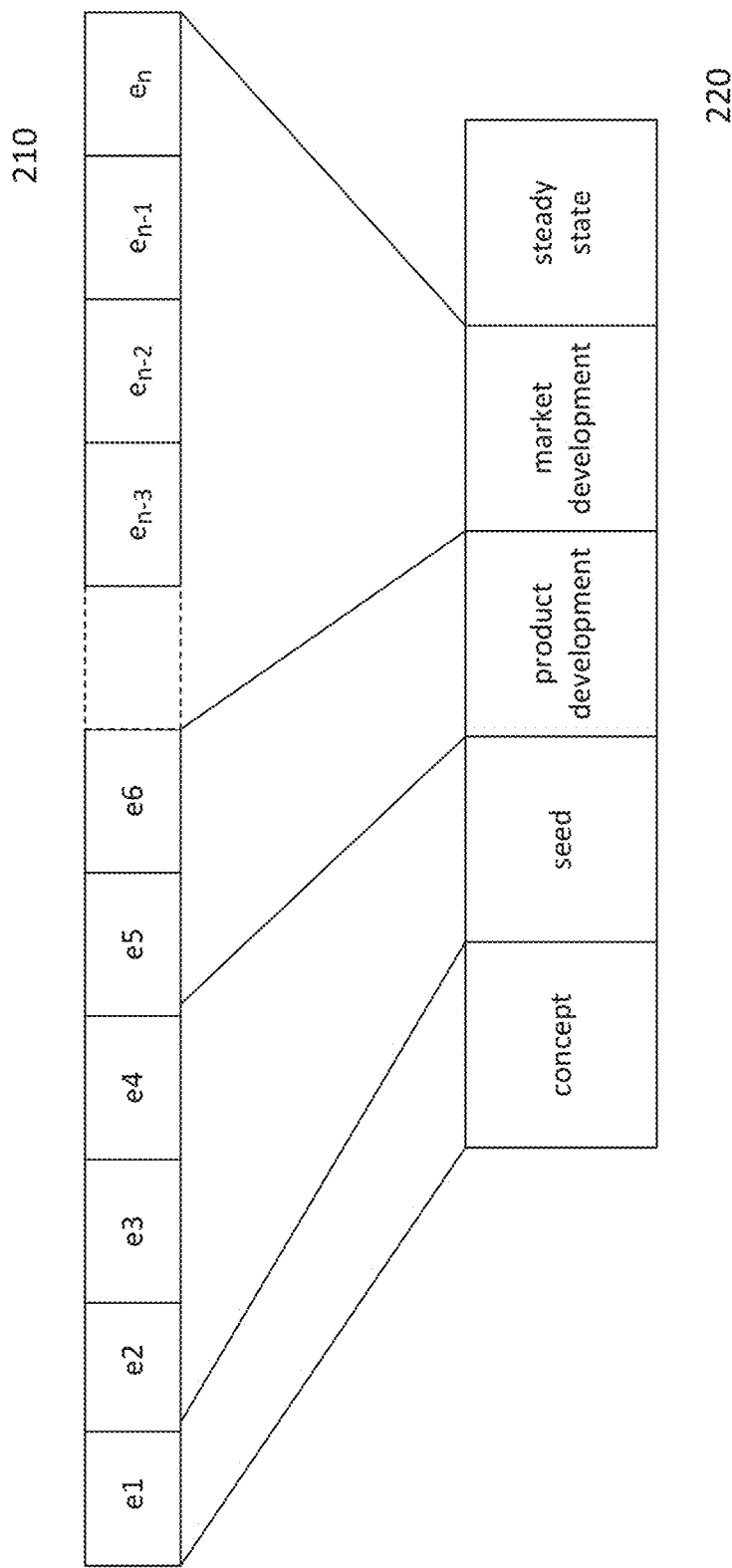
FIG. 1 illustrates an example Complex Hidden Markov Model of five hidden states of a company's life cycle, where each active state subsumes multiple events, in accordance with various embodiments.

Systems and methods for predicting the outcome of a business entity are presented. In embodiments, a system may receive explicit data reporting or indicating activities of a business entity, and other data from which information regarding the activities or level of operations of the entity may be inferred. Using one or more data processors, the system may generate inferred data regarding the business entity from a selected portion of the other data, and use at least some of the explicit data and the inferred data to determine which one of a series of defined sequential active states of development the entity currently is in. The system may further, using the result of the determination as the current state of the business, predict a final stage of the business entity, and a probability of evolving to that final stage from the current state. Other embodiments may be disclosed or claimed.

DETAILED DESCRIPTION

Introduction

Examples of systems, apparatus, computer-readable storage media, and methods according to the disclosed implementations are described herein. These examples are being provided solely to add context and aid in the understanding of the disclosed implementations. It will thus be apparent to one skilled in the art that the disclosed implementations may be practiced without some or all of the specific details provided. In other instances, certain process or method operations, also referred to herein as "blocks," have not been described in detail in order to avoid unnecessarily obscuring the disclosed implementations. Other implementations and applications also are possible, and as such, the following examples should not be taken as definitive or limiting either in scope or setting.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which are implemented via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which are implemented on the computer or other programmable apparatus provide processes for implementing the functions/acts specified in the flowchart and/or block diagram block or blocks.

In the following detailed description, references are made to the accompanying drawings, which form a part of the description and in which are shown, by way of illustration, specific implementations. Although these disclosed implementations are described in sufficient detail to enable one skilled in the art to practice the implementations, it is to be understood that these examples are not limiting, such that other implementations may be used and changes may be made to the disclosed implementations without departing from their spirit and scope. For example, the blocks of the methods shown and described herein are not necessarily performed in the order indicated in some other implementations. Additionally, in some other implementations, the disclosed methods may include more or fewer blocks than are described. As another example, some blocks described herein as separate blocks may be combined in some other implementations. Conversely, what may be described herein as a single block may be implemented in multiple blocks in some other implementations. Additionally, the conjunction "or" is intended herein in the inclusive sense where appropriate unless otherwise indicated; that is, the phrase "A, B or C" is intended to include the possibilities of "A," "B," "C," "A and B," "B and C," "A and C" and "A, B and C."

In embodiments, to solve certain predictive tasks information needs to first be represented and stored using sequences of events that can later be used to build predictive models. When the information regarding past events is simple, certain, obtained all at once or at regular intervals, and from homogenous sources, then sequences of events can be segmented deterministically using basic rules, and traditional machine learning methods can be applied to build models capable of predicting future events in the sequence using preceding events.

However, when the events are complex and the information that they represent is dynamic, incomplete, uncertain and produced by multiple heterogeneous sources of information traditional machine learning methods require repeating the model building process every time any of the following occur: the complex structure of an event changes, it is completed with more data, certain data is removed, or the level of uncertainty varies.

It is noted that various measures about private companies can be collected from multiple, distributed multiple sources of information. These measures usually only help represent a partial view of the company as most often companies only make public certain information they are interested in publicizing. Measures can also be inconsistent, and may change depending on the source, as well as the time at which the source is queried. In this domain, uncertainty stems not only from lack of public information but also because companies may intentionally hide certain information. It is in fact an adversarial domain.

In embodiments, systems and methods that are capable of efficiently building, adapting and reusing the story of private companies to predict their future stages using unsegmented sequences of complex events coming from multiple, distributed, and often inconsistent, sources of information may be provided. Such overall systems allow a collection of measures for a given company under analysis to be compared to analogous measures for both successful and unsuccessful companies.

In embodiments, methods involve representing, segmenting, and classifying the evolutionary time course of companies from founding to a successful exit event or dissolution, and evaluating where a potential investment lies in its evolution. In embodiments, the methods further involve comparing the initial evolution of a company that is being evaluated as a potential investment to both successful and unsuccessful companies, and their respective life cycles, so as to assess the likelihood that the company being evaluated will succeed.

It is noted that one important factor in the success of a startup company is the team of people working for the company. Accordingly, also disclosed are systems and methods that include characterizing individual team members and combining the individual characterizations into an aggregate characterization of the team. Such systems and methods may use machine learning technologies to evaluate multiple types of data regarding both individuals and teams to predict the likelihood that a company will be successful and therefore be a good investment. In embodiments, these individual and team characterizations can be combined with other measures of company performance relevant to predicting whether the company will succeed or fail.

Although the disclosed system and methods are described in the context of predicting the success or failure of private companies, they may further be applied to many other similar problems such as, for example, reconstructing and predicting the professional career of individuals, entities and organizations, and even governments.

Methods of Data Collections and Analysis

In embodiments, methods according to the present disclosure iteratively reconstruct the sequential stories (i.e., their developmental history) of private companies using multiple, heterogeneous, and distributed sources of information that may later be used to infer the current hidden stage of a new company and compute the probability of reaching future stages.

In embodiments, a company story may be represented using a Complex Hidden Markov Model (CHMM) having a set of sequential states of development. In the present disclosure these developmental states may be referred to as "hidden states", inasmuch as companies do not report what state they are in, or even use such a taxonomy to chart their own development. In such CHHMs, each hidden state has a 1-to-1 correspondence to each of the sequential stages that a company's life can go through. These stages may, for example, follow Bell's stages of: concept, seed, product development, market development and steady state (Bell, C. Gordon, *High-tech Ventures: The Guide For Entrepeneurial Success,* 1991), or, for example, they may follow a more institutional investment structure, such as Series-A, Series-B, Series-C, or other structures that may be useful in a given industry or context.

Each hidden state has associated with it a minimum and maximum duration, expected values for a number of sub-scores (defined below) for the stage that the hidden state represents, and a vector that defines the probability of transitioning to one of the final states defined below.

In embodiments, there may be two types of observable states. Final states and active states, next described.

Final states. When one of these states is reached it means that the company is in its last stage. Each final state can be associated with a success or failure depending on the associated economic output. In embodiments, final states may be recognized by observing or inferring public events using one or of multiple of information. Final states may comprise, for example, company closed, acquired, IPO (initial public stock offering), or "acqui-hired"—referring to an acquisition whose primary purpose was the hiring of high-value employees.

Active states. These states are not directly observed but may be inferred using the mechanism described below that approximates the activity expected at the current state depending on previously inferred activity states of similar companies. In embodiments, a mechanism to monitor the trend and evolution of a number of metrics and match them against previously expected predictions may be used to track and infer the state of a company. One such metric, for example, is called "Reach"—a composition of the number of followers on social networks (for example, Twitter, etc.).

A CHMM hidden state abstracts the life cycle of a company in a hierarchical way. Thus, each state represents a potentially large number of events that are all represented by an active state. A CHMM active state may subsume a number of events. This is illustrated in FIG. 1, which shows five states 210 in the life of a company, each of which may be subsume many actual events 220 (e.g., e1, e2, e3, ... $e_n$) in the activities of the company.

In embodiments, each company in the system has a CHMM associated with it. While the same CHMM may be associated with more than one company, a CHHM is instantiated separately for each company. In embodiments, a CHMM instantiation can monitor and predict the stages of a company.

Figure 2:
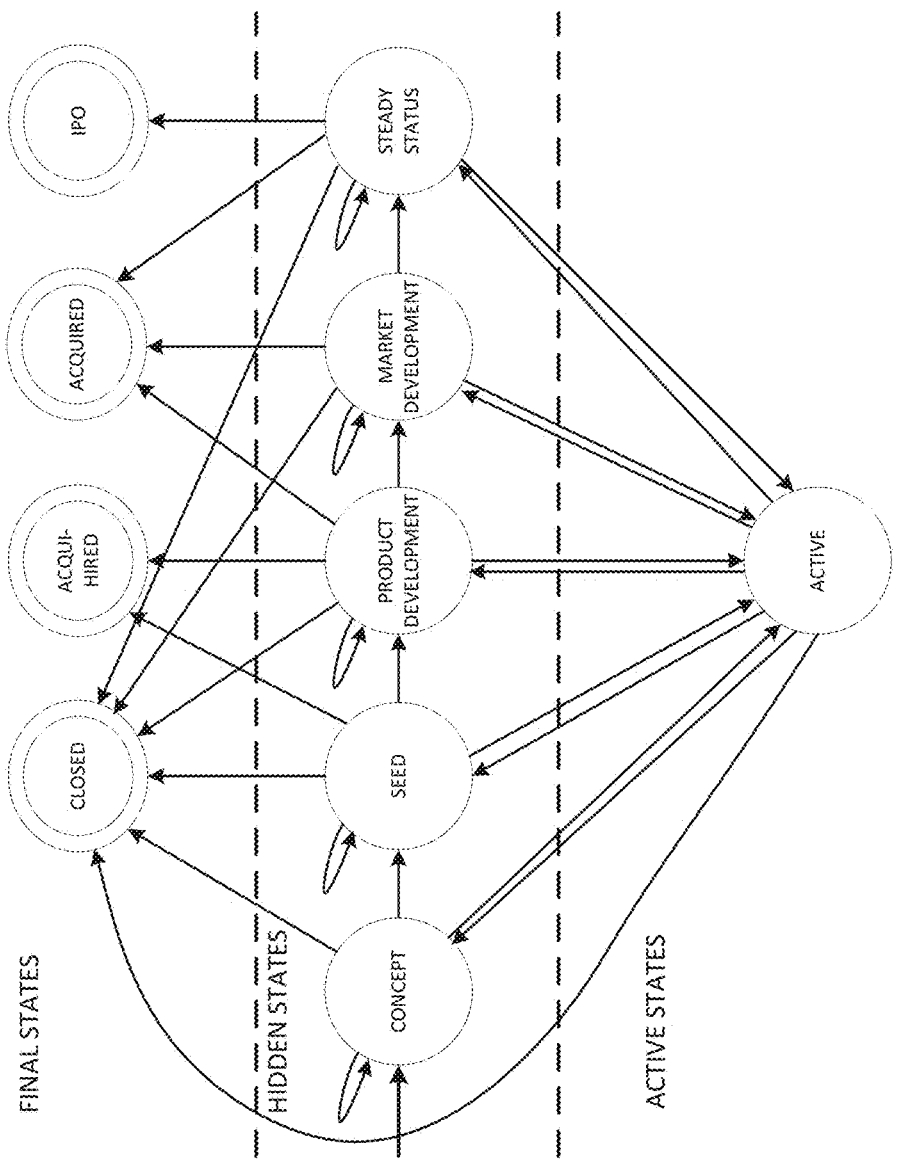
FIG. 2 illustrates the five hidden active states of FIG. 1 with four final states, and one actual active state, in accordance with various embodiments.

FIG. 2 illustrates an example CHMM with five hidden states, four final states, and one active state. It is noted that in general the number of hidden active states is variable, and may depend upon the industry, how the CHMMs are set up, and the available data.

In embodiments, the sources of data for a given company may include self-reported data, implicitly-generated data and explicitly generated data. Self-reported data (SRD) is financial or other type of information that can directly unveil the stage of a company and is reported directly by the company or as part of an official requirement. Explicitly-generated data (EGD) is data created by the company to promote itself through social networks, blogs, marketing channels, etc. Finally, implicitly-generated data (IGD) is data that can be inferred from self-reported data, explicitly generated data, or data generated by other sources, independent of the company. For example, the number of employees of a company can be approximated using the number of employees that individually report where they work on social networks.

In embodiments, each data source may have an associated a general level of confidence and individual level of confidence for each of the dimensions that can be extracted from the particular source.

In embodiments, sources can duplicate information or provide contradictory information, either simultaneously or over time. Each source may have an associated level of confidence as a whole and may also have a level of confidence for each attribute that is used to compute the various metrics described below. The level of confidence for each data source, and for each attribute provided by the data source, can change over time. When this happens the stories that are affected by the confidence level of those sources need to be adapted accordingly.

In embodiments, stories for a company may be reconstructed in multiple passes separated in time and using different sources of information. For companies that have reached a final state, their story can be completely reconstructed and can be used to construct a model that better computes the sub-scores that help match the active states.

Example System and Methods

Figure 3:
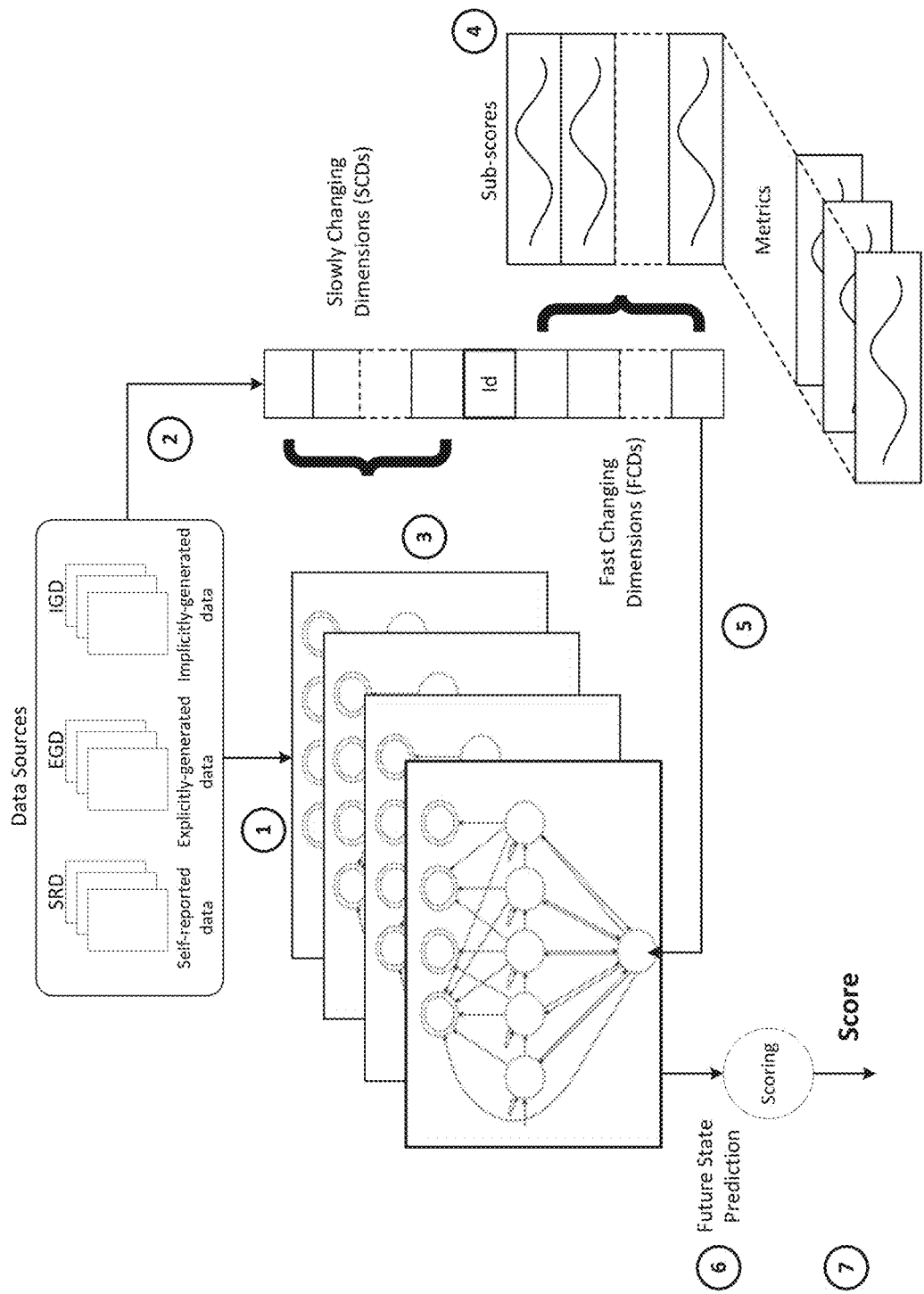
FIG. 3 illustrates a high level view of the operational flow of a process for collecting data, constructing a model, and generating a score for a company under analysis, in accordance with various embodiments.

FIG. 3 illustrates a high-level view of a system that may be used to implement various methods of the present disclosure. The illustrated system may comprise data sources 1 that are processed into slowly changing dimensions 3 and fast changing dimensions 5. Data comprising both of these types of dimensions may be automatically clustered, In embodiments, a system can process a number of data sources 1 that may provide data for individual or groups of entities in batches, or upon request, on a regular basis. Data sources 1may include self-reported data, explicitly-generated data, and implicitly-generated data, as described above.

In embodiments, data may be processed to generate a number of company stories using a CHMM for each group of similar companies, as shown at 1 in FIG. 3. To decide the of number of company stories to build, data may first be sequenced in time for all available companies and automatically clustered using a combination of SCDs 3 and FCDs 5, as shown at 2. In embodiments, both the number of clusters used, and the number of companies assigned to each cluster, may change over time when more company stories are reconstructed or previous company stories changed.

In embodiments, data can be textual, networked, and tabular, and may be obtained in CSV, JSON, XML or any other type of machine learning readable data. In embodiments, data can be input via web forms, documents, or requested via a remote API.

As noted, the data corresponding to or associated with each company may be extracted and processed to generate two types of dimensions: Slowly Changing Dimensions (SCDs) 3, which are Company attributes that only change from time to time (e.g., name of a company, address, etc.), and Fast Changing Dimensions (FCDs) 5, which are company attributes that may change frequently, or even constantly (e.g., number of employees, number of followers in social networks, etc.)

In embodiments, each dimension 3,5 may be represented by sequences of complex events. Each event, in addition to the information that describes the company's attribute, may also have associated with it a level of confidence. The level of confidence may generally depending on both the data source that generates the event and the particular level of confidence of that data source for the specific attribute.

A sequence of events that represents the sequential story of the company is generated using all the information collected from the company on each iteration.

Sequences of events can be segmented in non-deterministic ways, time-warped according to different criteria, compared with other sequences using dynamic distances that can later be used to automatically adapt model building for predictive tasks in a very efficient way.

In embodiments, for each entity, the closest story is found using the entity's SCDs. A distance is computed using a combination of the entity's SCDs and the centroid of the entities that were clustered together to compute each story.

In embodiments, each FCD may be a sub-score 4 that in turn may be computed using a number of metrics that change over time. Each time a new entity is monitored by the system a mechanism may be activated to retrieve or estimate the data points that comprise each metric. Sub-scores 4 may be estimated using non-linear combinations of the corresponding metrics.

In embodiments, the history of levels of activity across the various metrics may be compared against expected activity. Using the level of activity and the corresponding CHMM a prediction for the current state may be generated. This is represented by the "active state" at the bottom of FIG. 2. It is noted that in FIG. 3, the SCDs 3 and FCDs 5 are processed together with a CHMM to generate the active state, shown in a version of FIG. 2 for the company under analysis. It is from this instantiated CHMM for the company that a future state prediction 6, and a score 7 may be generated.

In embodiments, given the prediction for a hidden (active) state, the probability distribution for each final state, and the exit statistics for companies that were used to build the CHMM (the story), a score 7 may be computed. Preferably, each story may be built using the historic data of a number of companies (using a cluster of slowly-changing features (SCDs)), the data may include the exit amount (acquisition price, IPO amount, etc.). The score may be a number between 0 and 1. The closer to 1, the higher the chances that the company will become successful.

In embodiments, for each final state, an exit value (or an approximation) may be known. The exit value may be based on the average of exit values where only exits above a certain percentile and below a certain percentile are considered.

As the probability for each state is known an expected value may be computed. Finally, in embodiments, a maximum exit value may be normalized, corresponding to the 90th percentile.

Granular Description of Embodiment Including Software Environment

In embodiments, the following processes may be implemented. It is assumed that the embodiments include a software environment having registered users, who may use the environment to research companies and obtain predictions, using the system and methods according to the present disclosure, as described above. Such an embodiment may be referred to as "the service" in the following description.
1. Information Gathering
2. Consolidation
3. Data Transformation, Feature Engineering, Training models and making Predictions
4. Presentation of the Information—Website
5. Presentation of the Information—Analyst Platform.

These processes are next described in detail.

1—Information Gathering

In embodiments, two mechanisms may be used to obtain company data: one automatic and the other manual. The automatic mechanism may obtain information from either professional sources, such as Crunchbase, Owler, etc., or from online services such as Twitter, Facebook, LinkedIn, etc.

Manually sourced information allows registered users to give information that they know about the companies (most of the time it is privileged information). The manual information may be used to train the models and to make "custom" predictions for users that have shared the information. If someone is a user that knows that a company has received an investment that has not been published, he or she may use this information to get better predictions from the service, predictions that are different that those generated for all the users.

Additionally, in embodiments, information about investors, areas, and global economic indicators may be obtained.

2—Data Consolidation

Following obtaining information from all of the various different sources, a consolidation process may be performed. Some sources have more "confidence" than others and rules may be used to decide what the final information set for the company may comprise. For example, the Headcount of the company can come from either Crunchbase, Owler, LinkedIn, or other sources. In embodiments, the system may use the one from Crunchbase as the final value for Headcount.

In embodiments, the following information may be harvested about the companies. In embodiments, all of this information may be used to train models and make the predictions.

Company general information. This may include Foundation date, Legal Name, Commercial Name, Description, Elevator pitch, Website, Address-Location (Country, State, Region, City), Headcount, Market. Public/Private, Business areas, Current status: if the company is running, or has been acquired, if an IPO was made.

In embodiments, the system may crawl the company website to get more information about these categories. Most of the time it only gathers the home page, but in embodiments, it also captures the products/services pages.

Company team members, information about their CVs (professional history, education), current position, start/end dates.

Company Board.

Founders.

Funding: information about the rounds: amount, investors that have participated, % of each investor, date of the round.

Patents: which patens the companies have, covering what technologies, when they were issued, patent abstracts.

Social Networks Activity (Twitter, Facebook). Tweets, Followers, Following, Description, Likes performed, Last tweet date.

In embodiments, information may be continuously harvested, and a company footprint may be based on the results of this harvesting, creating its timeline view.

3—Data Transformation, Feature Engineering, Training Models and Making Predictions In embodiments, a system may have more than 100 ETLs (Extract, Transform and Load processes) to maintain the company history, metrics, train models, make predictions and publish the data to a system web site.

To train the models, and thereby get predictions about the companies for whom data is being gathered, the system may use BigML and other ML/NPL algorithms.

In embodiments, the following predictions may be performed by a system:

Company transitions. The likelihood of a company being running, IPO, acquired, acqui-hired, zombie or closed.

Company score. The likelihood of success of the company.

Company stage. Identification of the different stages the company has passed through and the current stage. (Concept, Seed, Product Development, Market Development, Steady).

Company top area. From all the business areas of the company (obtained through the professional sources), identify the main one.

Days to exit. The expected exit date.

Ranking of the company in various areas: in the World, in their Country, in their Business Area.

Top competitors. The list of top competitors for the company.

Top similar. The list of top similar companies. Companies that have something in common with the company. No matter if the companies compete in the same market or not. This can help the companies to find synergies.

Company business areas (may use the areas that come from the professional sources such as Crunchbase, as well as other sources).

Days until the next funding round.

Amount of the next funding round.

Company valuation.

4—Presentation of the Information—Website.

In embodiments, various and different visualizations may be used to present the data generated in the previous stages.

Company Profile: Search for the profile of any of the more than 400K companies that are available in PreSeries. All of the descriptive and predictive information that the system generates about them may be shown.

Investor Profile: All of the descriptive and predictive information that the system generates about the investors.

Rankings of investors: in embodiments, a user may obtain listings of investors using different criteria. Ordering by number of companies invested, amount invested, focusing only in one location, selecting investors that have invested in specific areas, or that invest in specific stages of the company, etc.

Comparison tool for Investors. In embodiments, the system may give users the ability to compare investors using a scatterplot and different metrics.

Rankings of Areas. Same as rankings of investors, but applied to areas.

Comparison tool for Areas. In embodiments, the system may give users the ability to compare areas using a scatterplot and different metrics.

5—Presentation of the Information—Analyst Platform.

In embodiments, an advanced type of subscription to the system may be offered: the ANALYST subscription. This advanced access give an "Analyst" subscriber access to all the datasets and models used to make the predictions.

In embodiments, these advanced users may play with the data generated by the system (datasets) and create their own models.

In embodiments, this functionality may be provided by using the BigML Platform. The inventors have, in exemplary embodiments, integrated BigML into PreSeries to give a better user experience (appearance, automatic creation of the accounts, auto-login in BigML from PreSeries using a link, etc.).

In alternate (advanced) embodiments, an analyst subscriber may plug their own Models into the PreSeries system. They may thus customize PreSeries as they may desire, which can be of great value for them, and give to them a significant competitive advantage.

Given both the description of FIGS. 2-3, and the more granular description of the example embodiment presented above, next described are FIGS. 4-21, which include various screen shots from a software environment related to an exemplary PreSeries embodiment implementing a system and methods according to the present disclosure.

Figure 4:
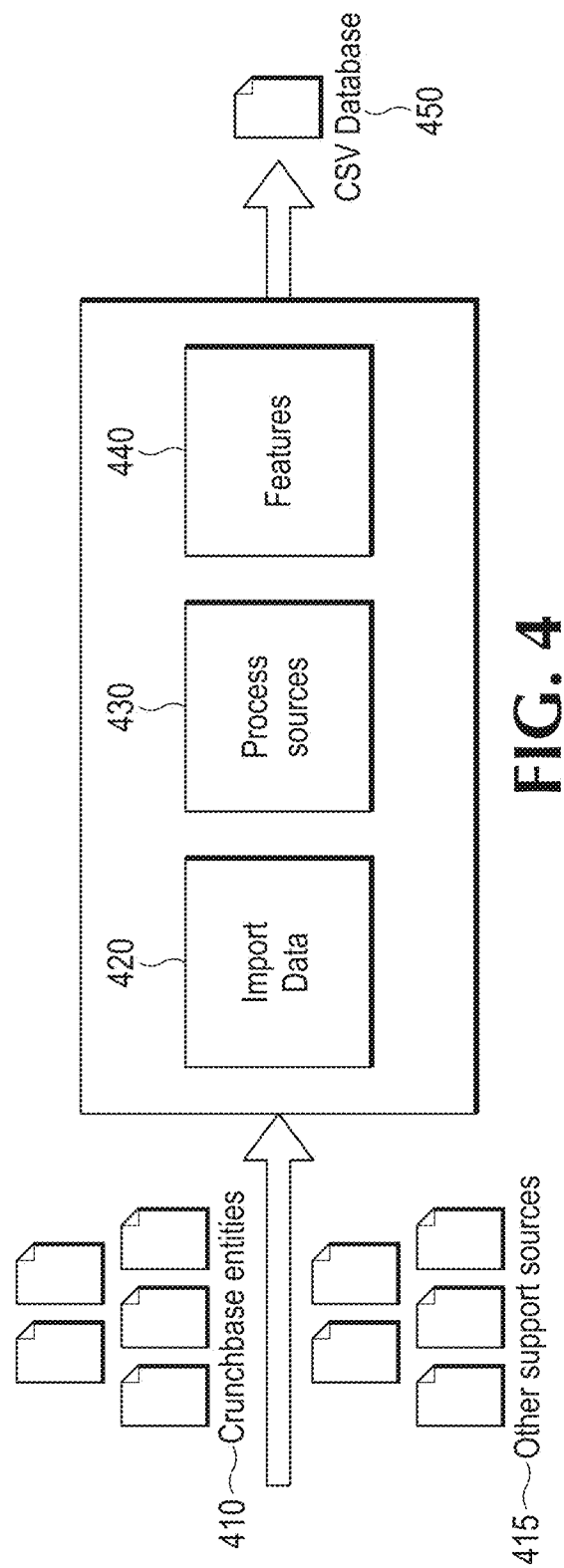
FIG. 4 illustrates the gathering and processing of information regarding companies or entities to generate a CSV database, in accordance with various embodiments.
Figure 5:
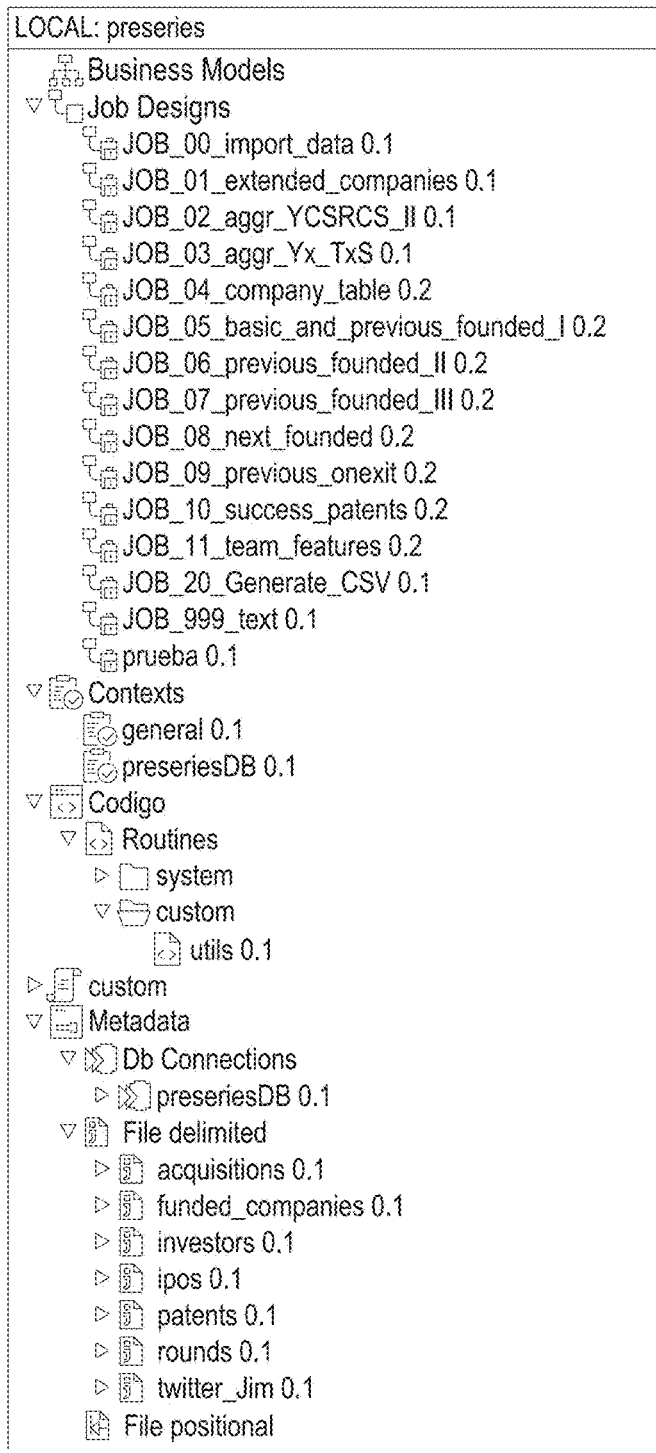
FIG. 5 illustrates a screen from an exemplary software environment in accordance with various embodiments showing a set of jobs, contexts, code and templates that may be used to import, transform and generate a CSV database as shown in FIG. 4, ready to model.
Figure 6:
FIG. 6 illustrates a screen from an exemplary software environment illustrating the importation of basic files into a local database, in accordance with various embodiments.

FIG. 4 illustrates the gathering and processing of information regarding companies or entities to generate a CSV database, in accordance with various embodiments. Referring to FIG. 4, data may be obtained from various support sources, including Crunchbase entities 410, or other support sources 415. The data may then be imported 420, processed 430 and features extracted 440, to populate a CSV database 450, as shown. It is such a database that may be used to generate FIG. 5 illustrates a screen from an exemplary software environment in accordance with various embodiments showing a set of jobs, contexts, code and templates that may be used to import, transform and generate a CSV database as shown in FIG. 4, ready to model;

FIG. 6 illustrates a screen from an exemplary software environment illustrating the importation of basic files into a local database, in accordance with various embodiments.

Figure 7:
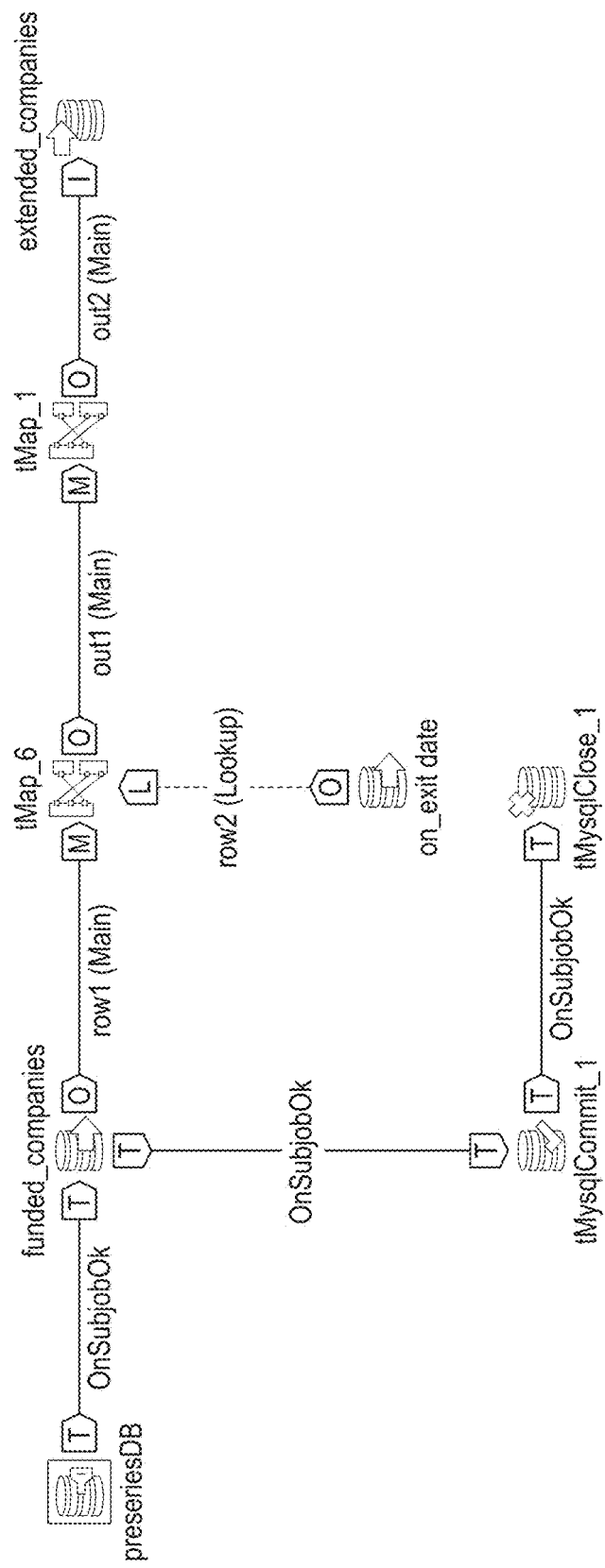
FIG. 7 illustrates a screen from an exemplary software environment illustrating the extension of companies with additional data, in accordance with various embodiments.

FIG. 7 illustrates a screen from an exemplary software environment illustrating the extension of companies with additional data, in accordance with various embodiments.

Figure 8:
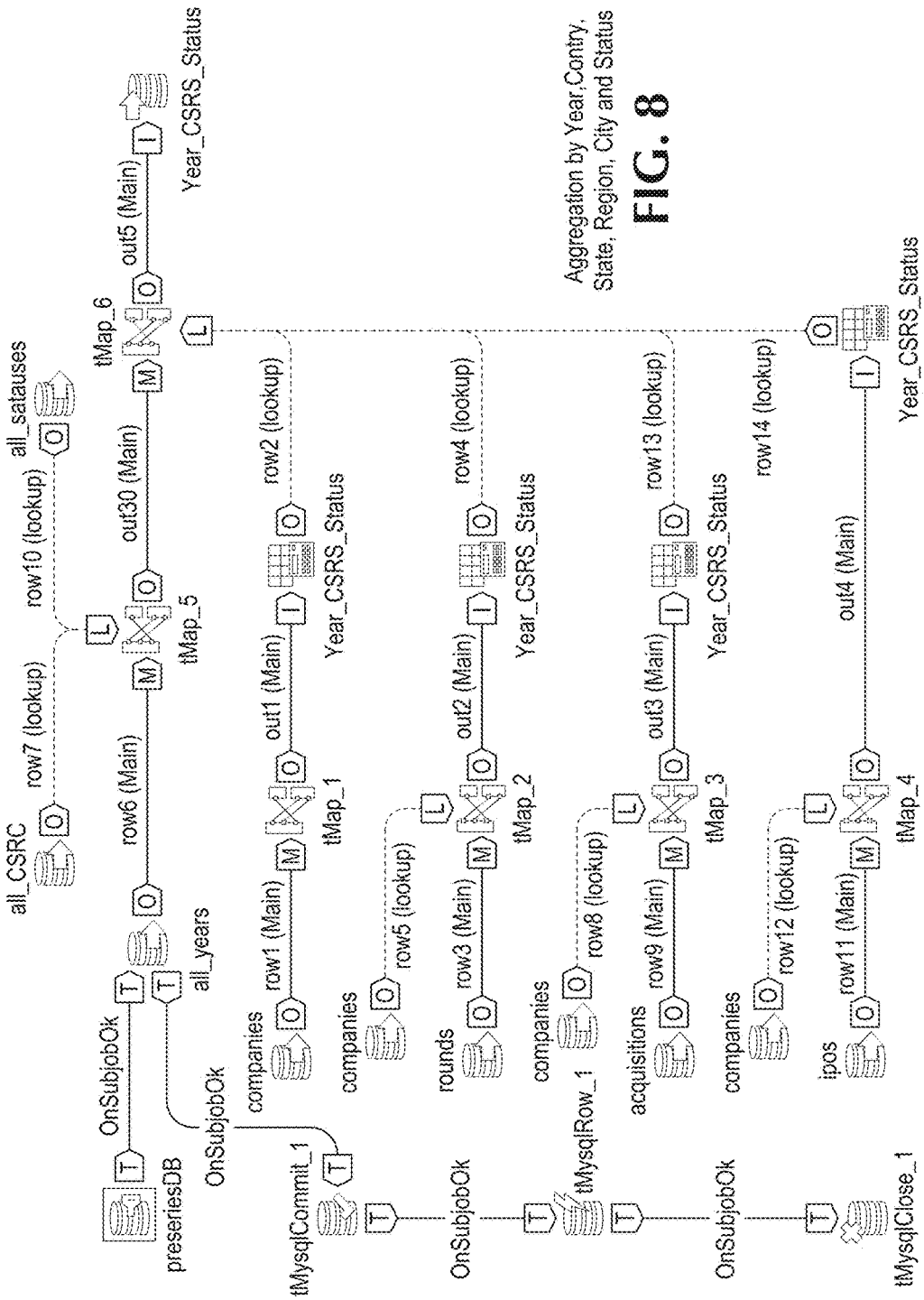
FIGS. 8-9 illustrate a screen from an exemplary software environment illustrating the aggregation of data by year, country, state, region, and city, and by year, country, state, region, city and status, in accordance with various embodiments.
Figure 9:
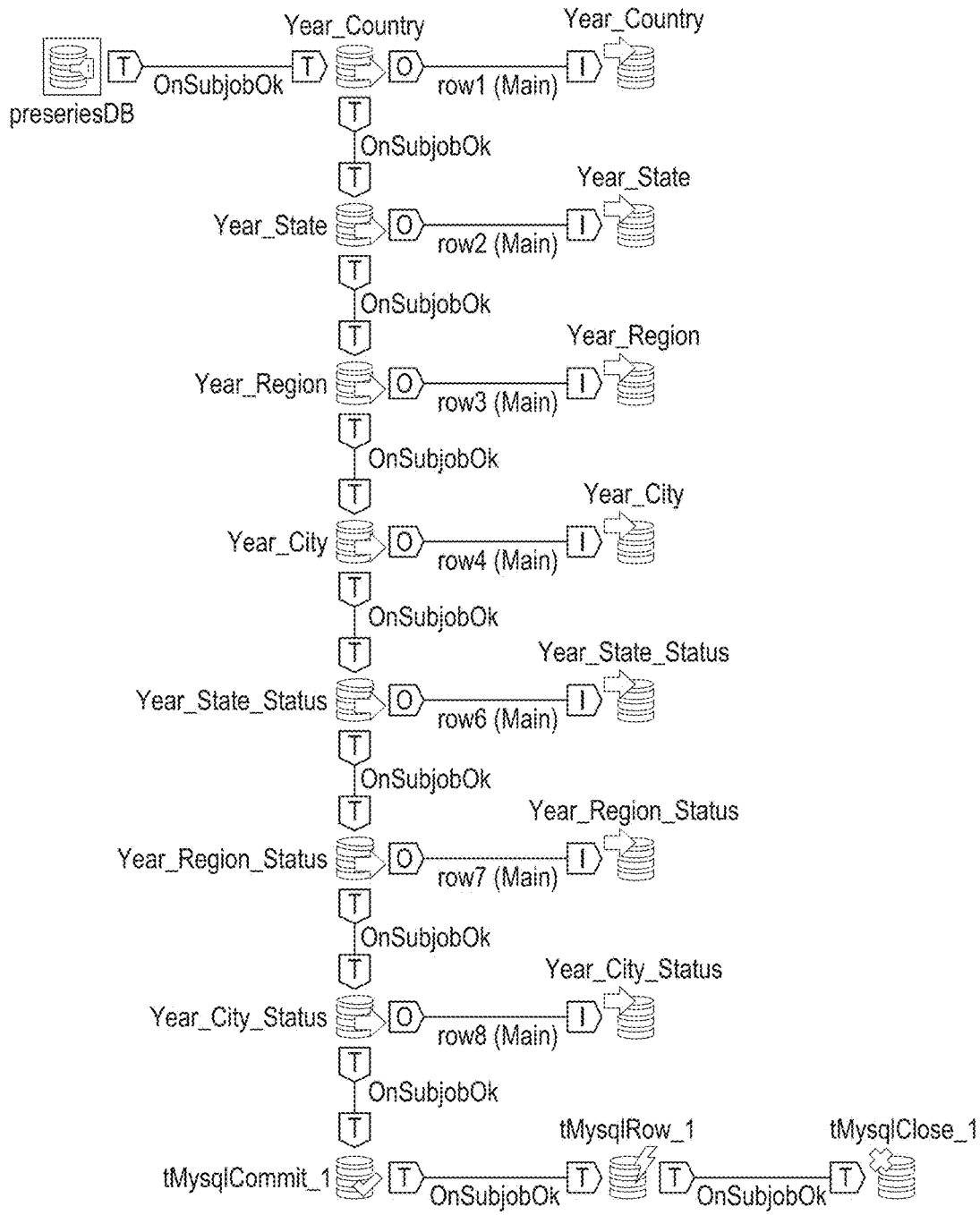

FIGS. 8-9 illustrate a screen from an exemplary software environment illustrating the aggregation of data by year, country, state, region, and city, and additionally by year, country, state, region, city and status, in accordance with various embodiments.

Figure 10:
FIG. 10 illustrates a screen from an exemplary software environment illustrating the creation of a final dataset structure, in accordance with various embodiments.

FIG. 10 illustrates a screen from an exemplary software environment illustrating the creation of a final dataset structure, in accordance with various embodiments.

Figure 11:
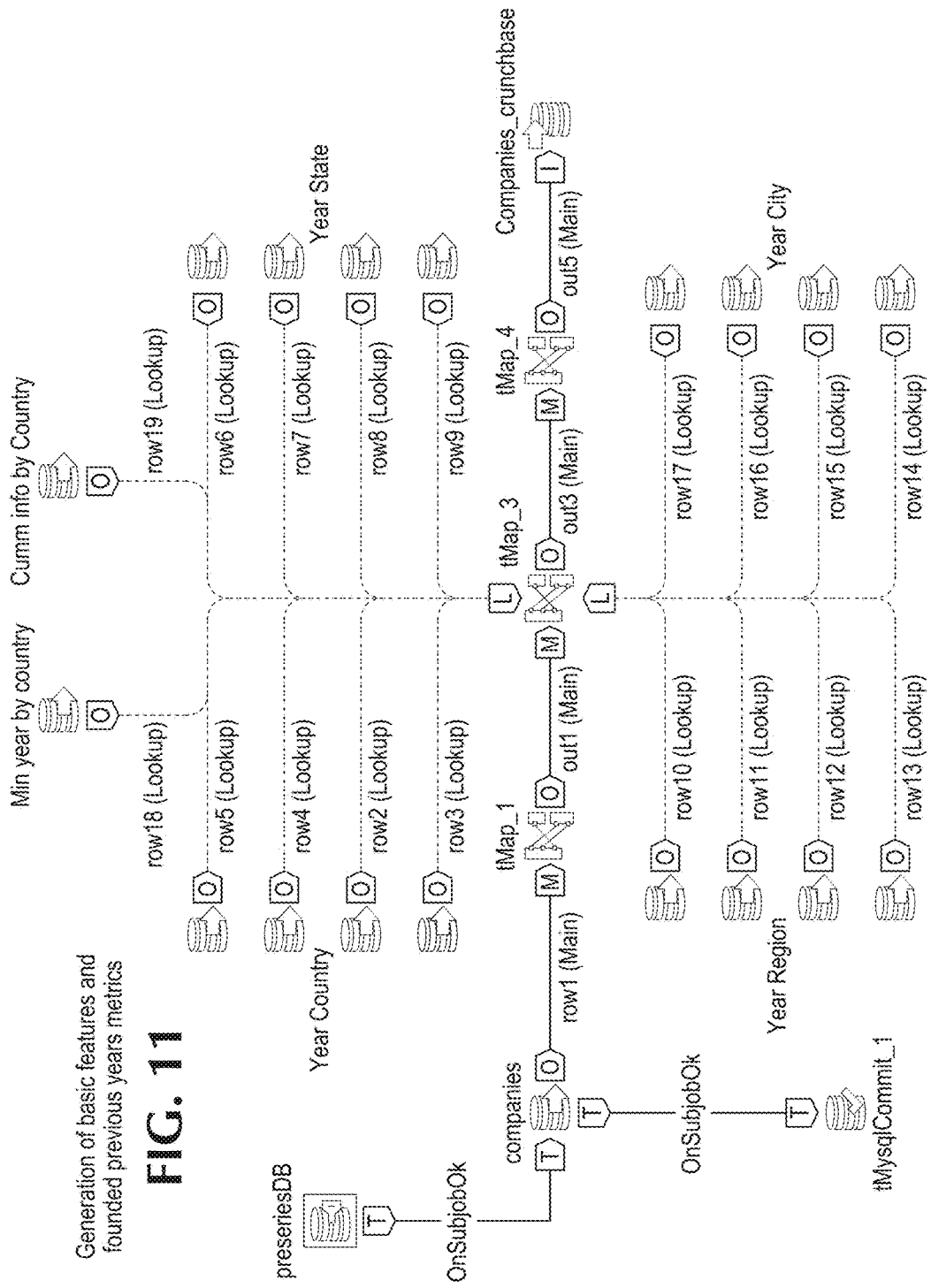
FIG. 11 illustrates a screen from an exemplary software environment illustrating the generation of basic features and founded previous years' metrics, in accordance with various embodiments.

FIG. 11 illustrates a screen from an exemplary software environment illustrating the generation of basic features and founded previous years' metrics, in accordance with various embodiments.

Figure 12:
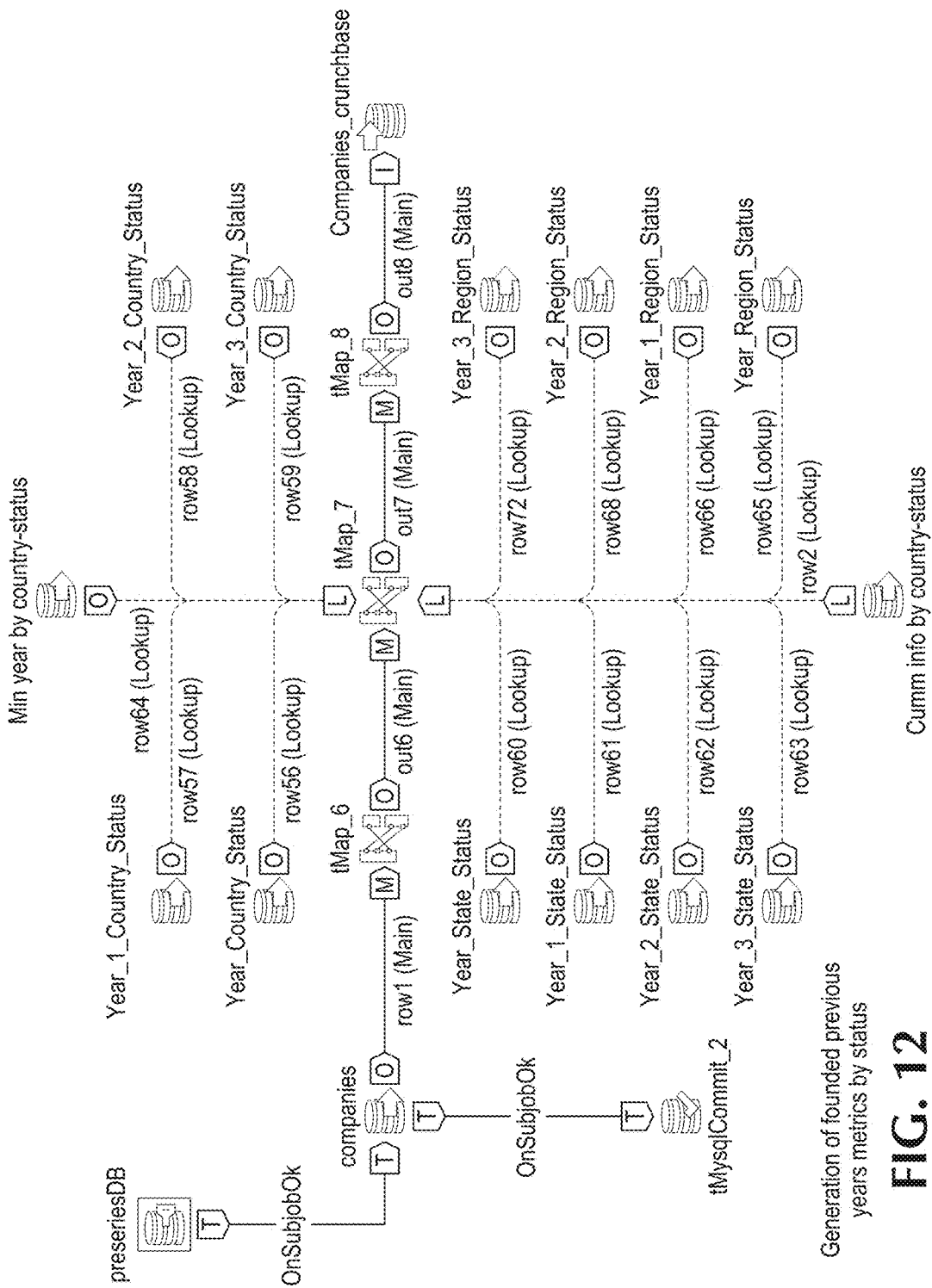
FIG. 12 illustrates a screen from an exemplary software environment illustrating the generation of founded previous years' metrics by status, in accordance with various embodiments.

FIG. 12 illustrates a screen from an exemplary software environment illustrating the generation of founded previous years' metrics by status, in accordance with various embodiments.

Figure 13:
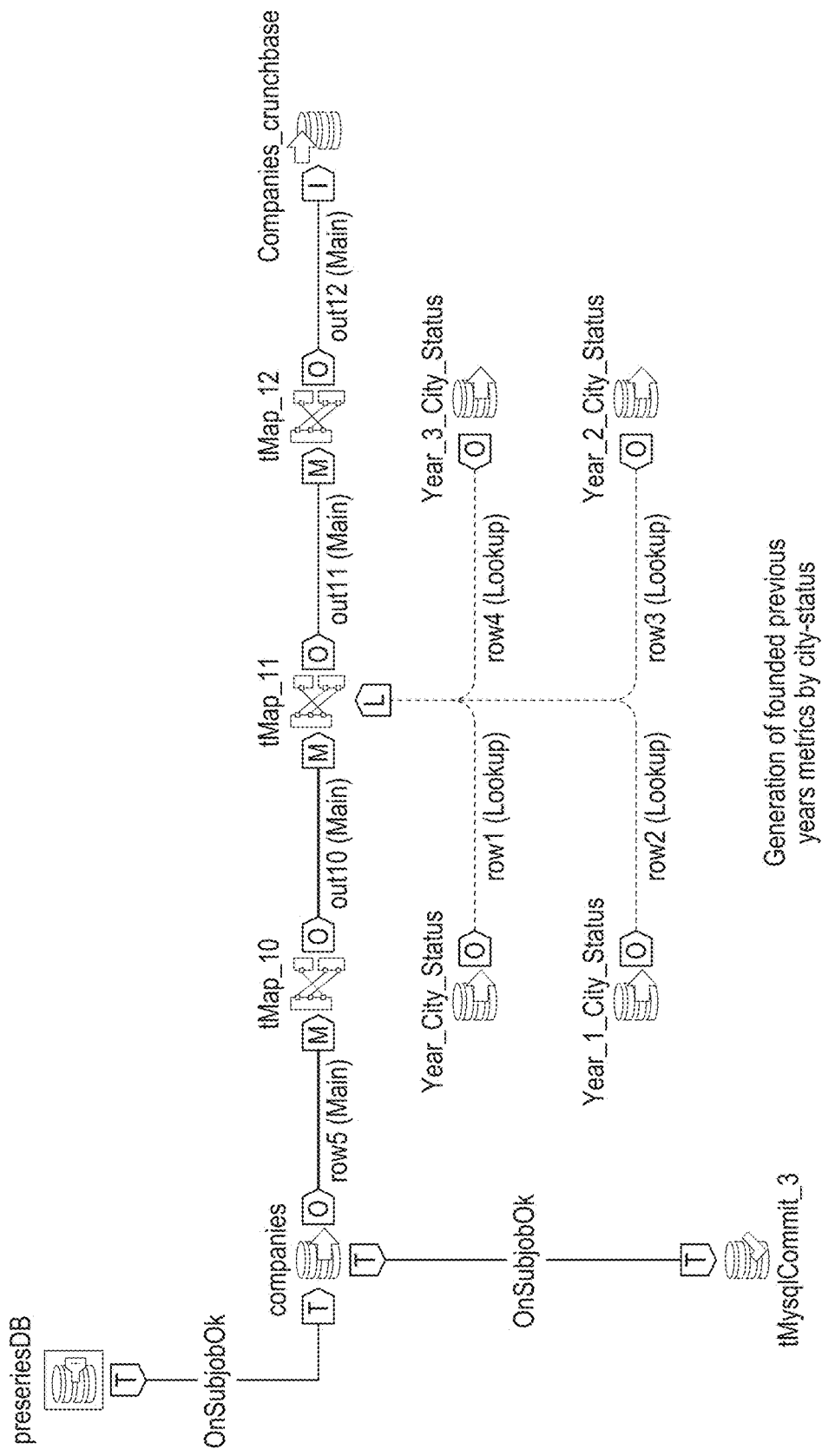
FIG. 13 illustrates a screen from an exemplary software environment illustrating the generation of founded previous years' metrics by city-status, in accordance with various embodiments.

FIG. 13 illustrates a screen from an exemplary software environment illustrating the generation of founded previous years' metrics by city-status, in accordance with various embodiments.

Figure 14:
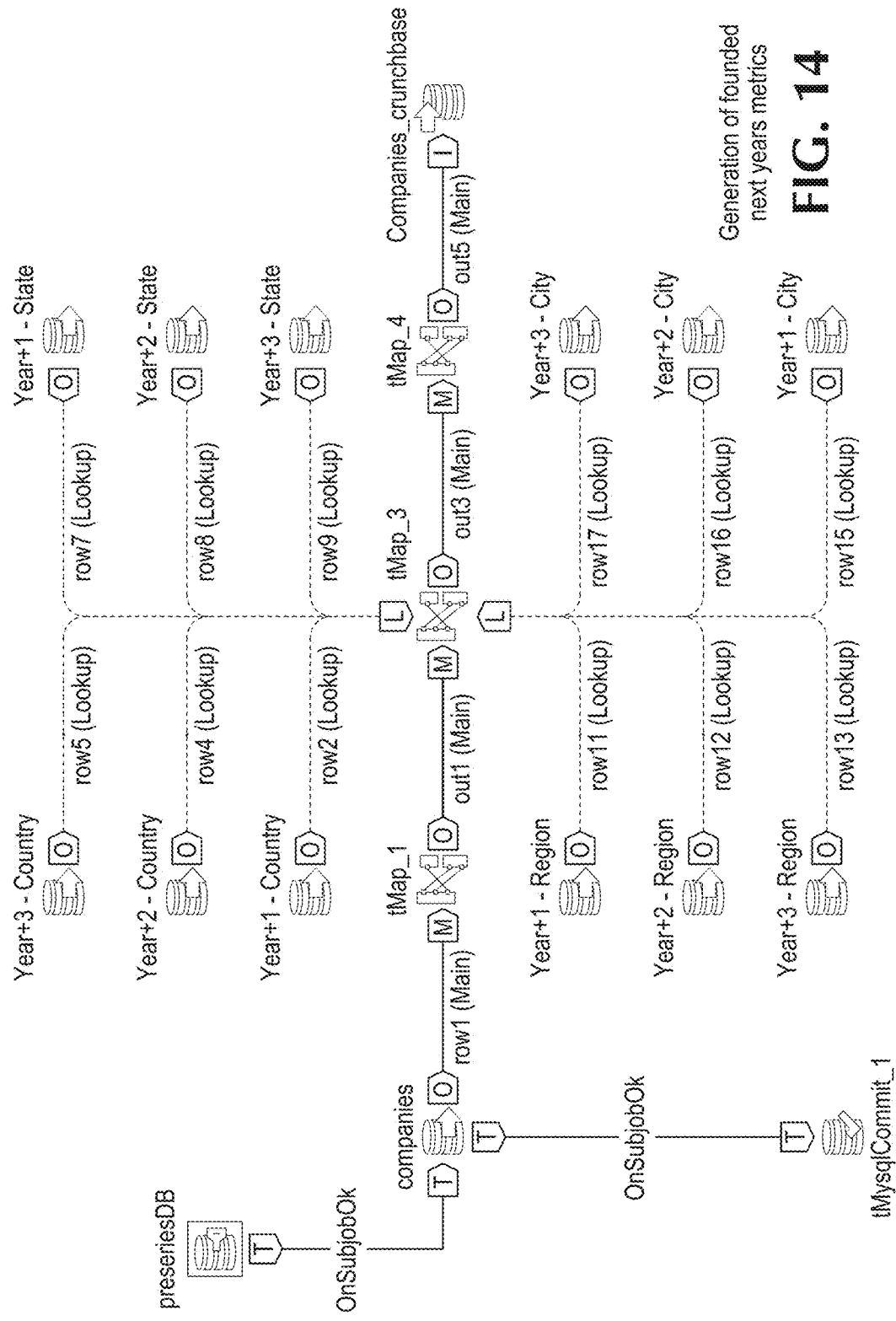
FIG. 14 illustrates a screen from an exemplary software environment illustrating the generation of founded next years' metrics, in accordance with various embodiments.

FIG. 14 illustrates a screen from an exemplary software environment illustrating the generation of founded next years' metrics, in accordance with various embodiments.

Figure 15:
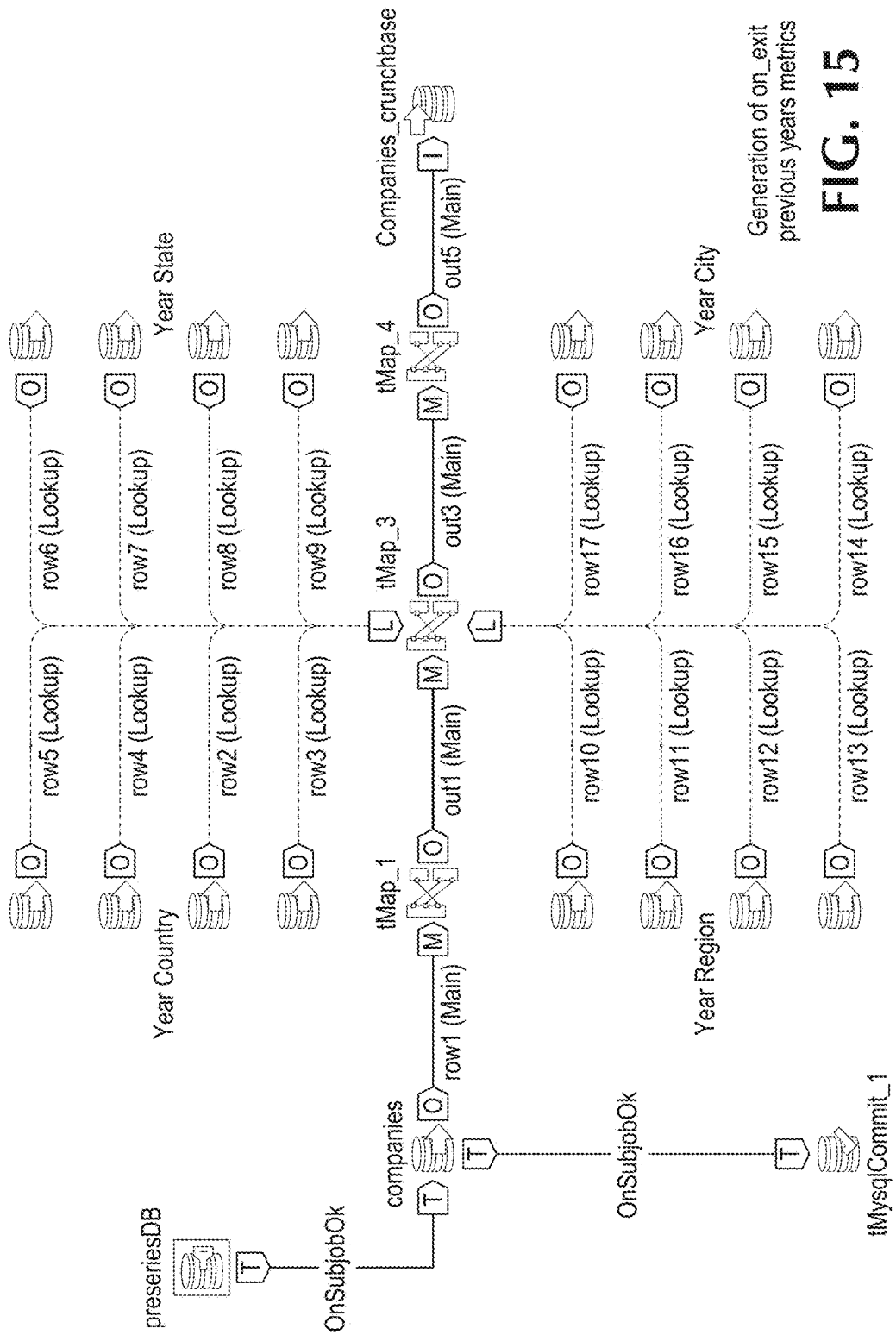
FIG. 15 illustrates a screen from an exemplary software environment illustrating the generation of on exit previous years' metrics, in accordance with various embodiments.

FIG. 15 illustrates a screen from an exemplary software environment illustrating the generation of on exit previous years' metrics, in accordance with various embodiments.

Figure 16:
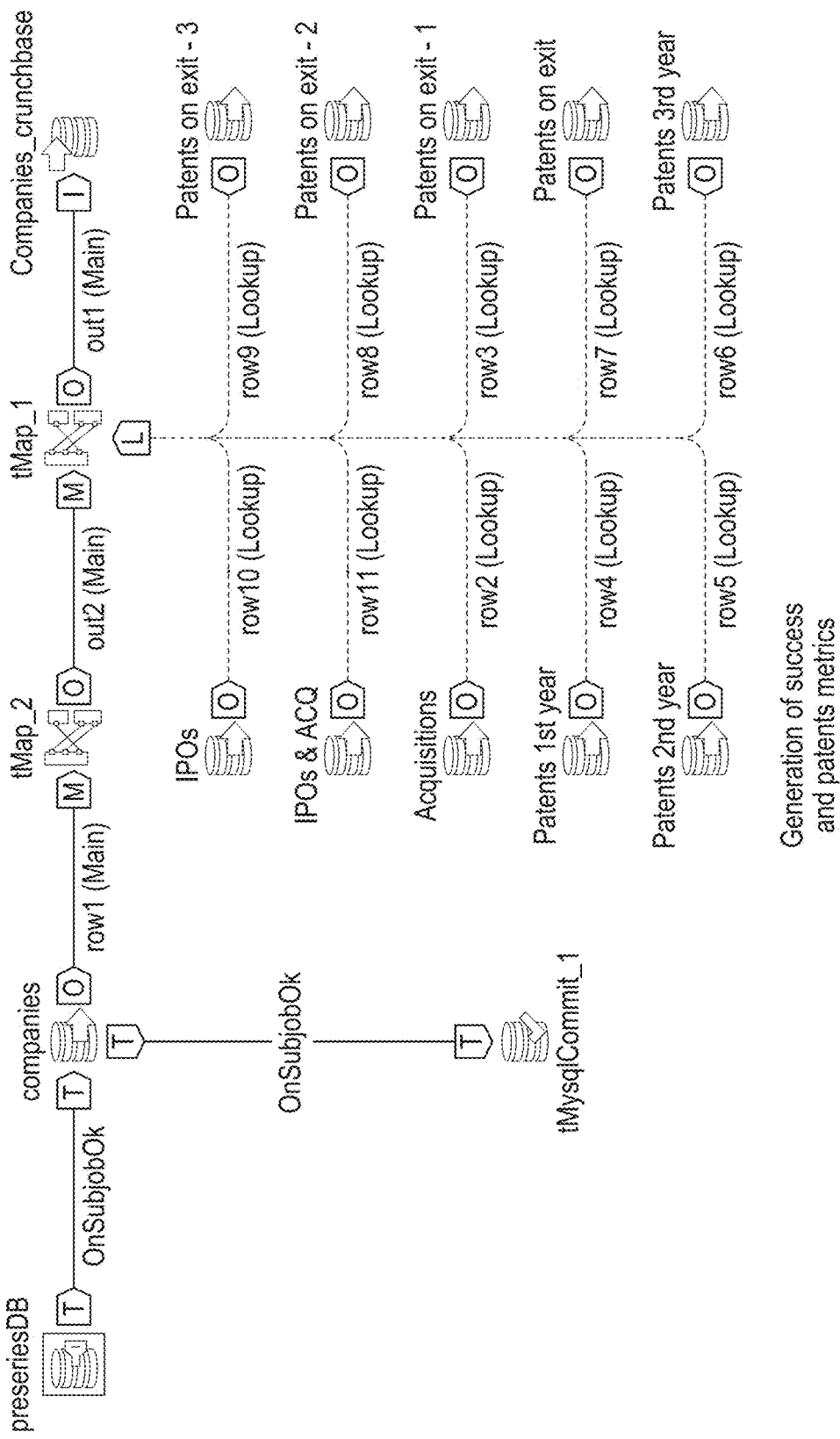
FIG. 16 illustrates a screen from an exemplary software environment illustrating the generation of success and patent metrics, in accordance with various embodiments.

FIG. 16 illustrates a screen from an exemplary software environment illustrating the generation of success and patent metrics, in accordance with various embodiments.

Figure 17:
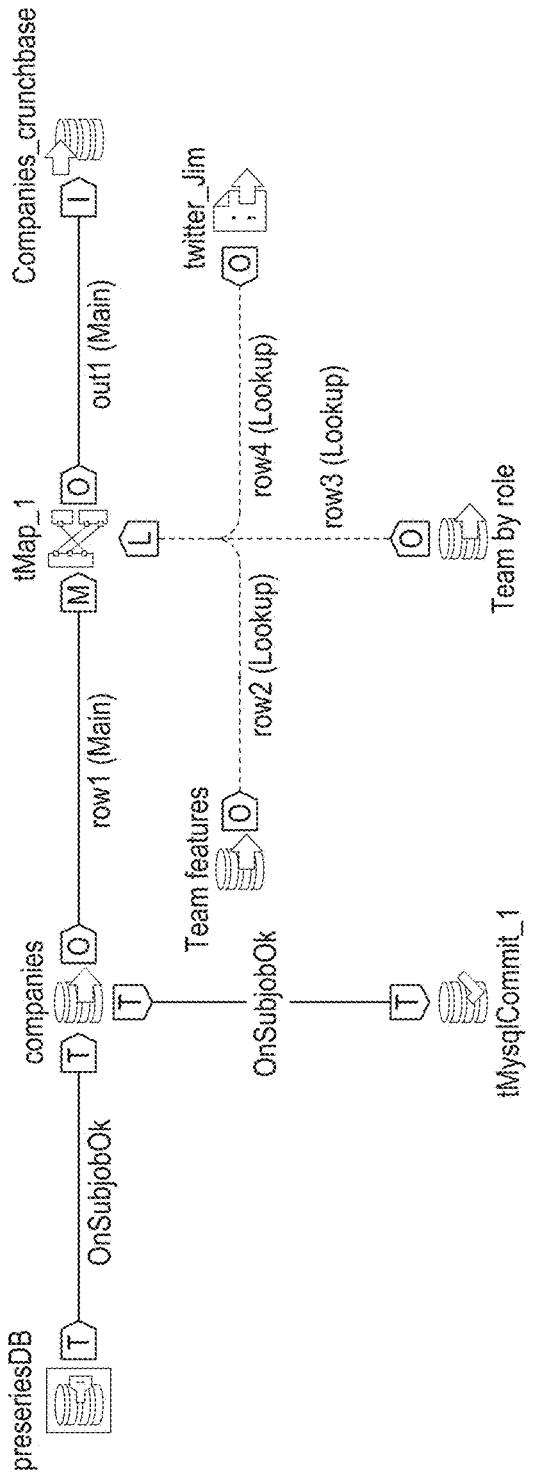
FIG. 17 illustrates a screen from an exemplary software environment illustrating the generation of team, roles and Twitter™ metrics, in accordance with various embodiments.

FIG. 17 illustrates a screen from an exemplary software environment illustrating the generation of team, roles and Twitter™ metrics, in accordance with various embodiments.

Figure 18:
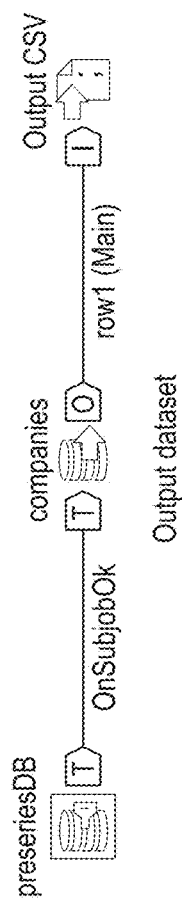
FIG. 18 illustrates a screen from an exemplary software environment illustrating the generation of an output dataset, in accordance with various embodiments.

FIG. 18 illustrates a screen from an exemplary software environment illustrating the generation of an output dataset, in accordance with various embodiments.

Figure 19:
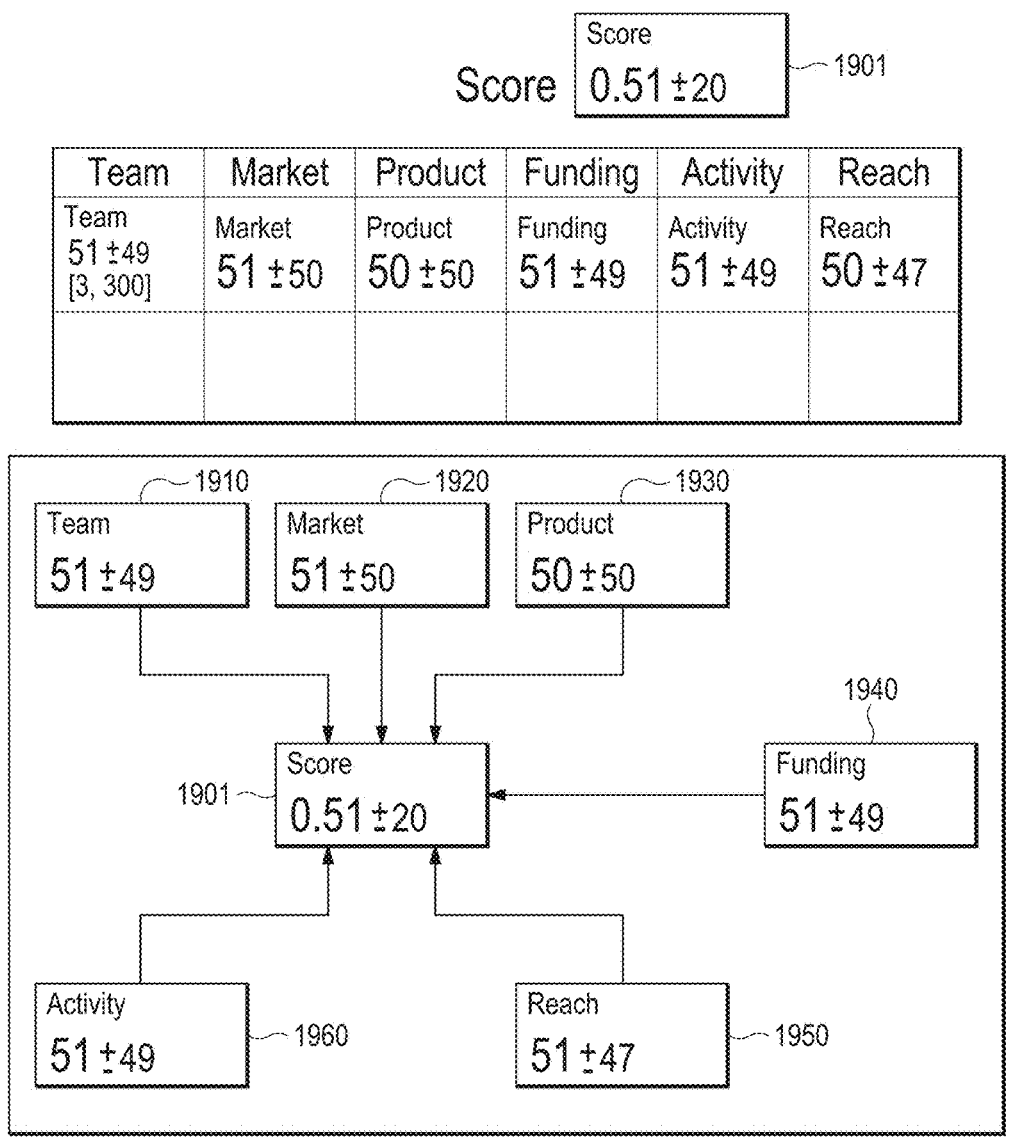
FIG. 19 illustrates a screen from an exemplary software environment illustrating the generation of a final score with a confidence interval for a given company, in accordance with various embodiments.

FIG. 19 illustrates a screen from an exemplary software environment illustrating the generation of a final score 1901, for a given company, in accordance with various embodiments. With reference to FIG. 19, the company's final score 1901 is generated from six subparts, relating to different performance areas of the company, including individual scores for each of team 1910, market 1920, product 1930, funding 1940, activity 1960 and reach 1950. These individual scores may be combined using various weightings to generate the overall score 1901 and its overall confidence interval. In the illustrated case, each of the subpart scores is close to the final score of 51. The final score is expressed as a decimal fraction of 1.0.

Figure 20:
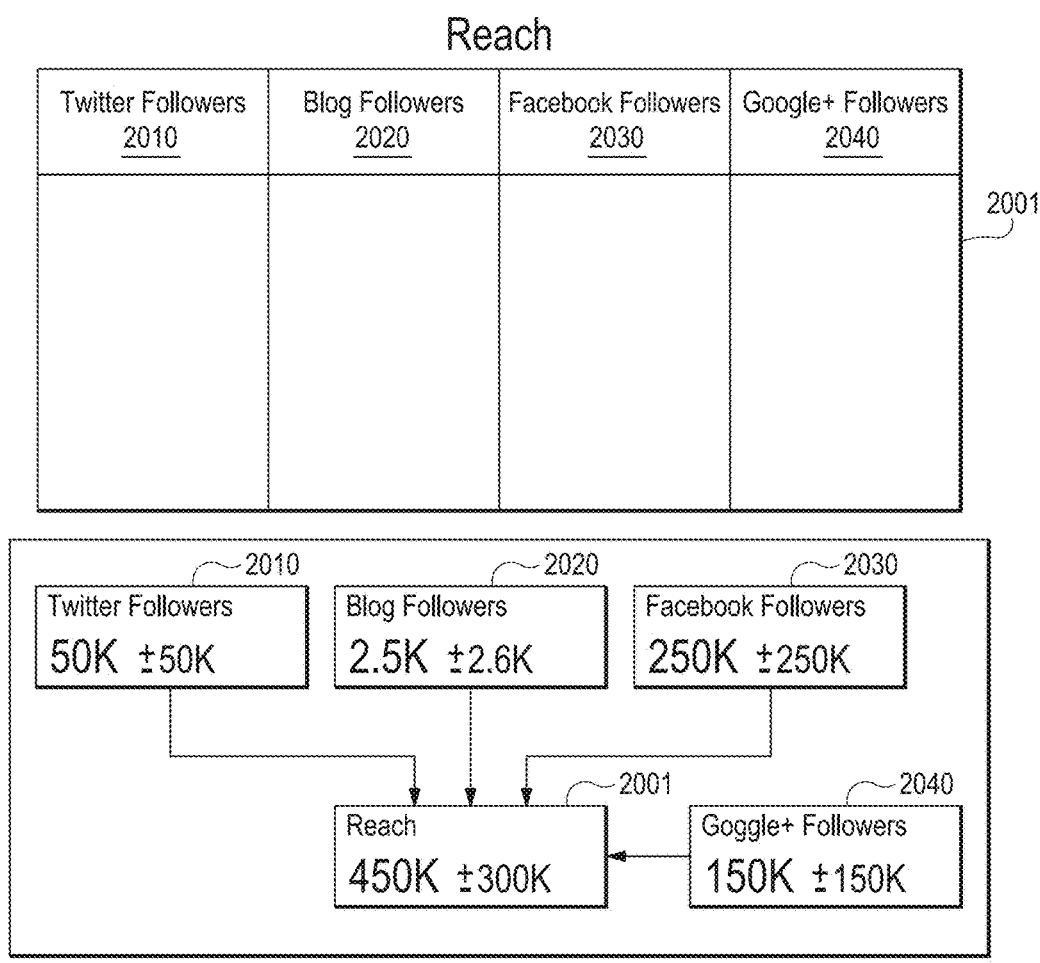
FIG. 20 illustrates a screen from an exemplary software environment illustrating the calculation of a company's reach value, in accordance with various embodiments.

FIG. 20 illustrates a screen from an exemplary software environment illustrating the calculation of a company's reach value, in accordance with various embodiments. Referring to FIG. 20, the reach 2001 of a company may comprise its followers or subscribers on various on-line outlets, such as, for example, Twitter followers 2010, blog followers 2020, Facebook followers 2030 and Google followers 2040. In the case of reach, the followers or subscribers from all on-line outlets or interactive media are added to obtain the overall reach 2001 of the company.

FIG. 21 illustrates a screen from an exemplary software environment illustrating in detail various components of a final score 2110. Referring to FIG. 21, the calculation of a score 2110 here is an alternate process to that illustrated in FIG. 19. Here the final score is a function of nine categories of company performance, organized in four main groupings: People 2120, Marketing 2140, Product 2150, and Finance 2180. Each main grouping has, in this example, three sub-categories, as follows: People 2120 includes CEO, Board of Directors, and Team (examples of how to calculate the value of a team to a given company are described more fully below in connection with FIGS. 22 through 26). Marketing 2140 includes Sales, Marketing, and Business Plan. Product 2150 includes Engineering, Technology and Development, and finally Finance includes Financeability, Control and Cash.

In embodiments, by calculating various metrics regarding a company along these twelve sub-categories, and combining the metrics in various ways as illustrated in the example screens shown in FIGS. 4 through 20, an overall score 2110 may be generated. FIG. 21 provides a set of example scores generated using the scoring approach illustrated in the upper panel.

Team Scores And Entrepeneurial Character

As noted above, in embodiments, a technical tool for evaluating investment opportunities to identify those which are likely to be more successful than others is presented in this disclosure. As also noted, such a tool would allow an investor to evaluate startups early in their evolution and to predict the success they are likely to achieve. One important factor in the success of a startup company is the team of people working for the company. Thus, FIG. 17, described above, illustrates the generation of team and team by role metrics in accordance with various embodiments.

Thus., system and methods are also disclosed that include characterizing individual team members and combining the individual characterizations into an aggregate characterization of the team. In embodiments, the system and methods next described may use machine learning technologies to evaluate multiple types of data about individuals and teams to predict the likelihood the company will be successful and therefore be a good investment. These individual and team characterizations can be combined with other measures of company performance relevant to predicting whether the company will succeed or fail, such as were described above.

Thus, in embodiments, besides external data regarding a company and its activities, i.e., data that relates to or describes the activities of a company and those of its individual members or employees, a system may go significantly further, and infer certain highly relevant character traits of its individual members, as well as groups of such individuals working as a team in various aspects of a company. In embodiments, a system may infer the entrepreneurial character of an individual (team member) and a group of individuals working as a team (team) using disperse and heterogeneous sources of data. In what follows, the "entrepreneurial character" will sometimes be referred to by the acronym "EC."

An EC represents whether an individual entrepreneurial current character is appropriate to start or continue leading a company and if the character will evolve positively or negatively. In embodiments, data to be used in an EC analysis may be extracted from web pages, structured forms, or documents in different formats (e.g., pdf, doc, etc.). The data may be collected during an extended period of time at more or less regular intervals.

In embodiments, an entrepreneurial character (EC) may be comprise a feature vector, where each individual feature can be either of type Boolean (with an associated confidence level) or of type Numeric, a value normalized within a certain scale. Each individual feature may also have associated with it a pair of values: (1) a number that represents the level of mutability of the character, and (2) a sign. These values may respectively be used to know whether the value associated with an individual character feature is expected to change (mutability), and in which direction (positively or negatively) that change may likely occur. For each feature, the evolution of its value, mutability level, and sign may be stored over time.

In embodiments, the values that together compose an EC can be summarized into one single value that may then be used to rank individuals with respect to each other. To compute the EC of a team, the individual EC of each team member may first be computed.

In an individual EC, in general, the entrepreneurial character improves when the value of each one of the features is maximized. However, in a team EC, the character can become worse when the same features are maximized for more than one team member. For example, considering that in a given embodiment one of the EC features is "strong-willed", it would be disastrous for the team if two or more team members scored highly in it. Two alphas may actually destroy a team, rather than achieve its goals. For other features, however, such as "expertise in a certain topic X", where more than one team member has significant expertise, that may be very positive. On the other hand, where multiple team members have each reached significant mastery of a subject, and the subject is different for each, the synergy thereby created may be much more valuable where the mastered subjects are different, implying that diversity is good. For example, in the early history of Apple Computer, Steve Jobs was a master marketer and entrepreneur. Steve Wozniak was a technical genius, who could create the least number of parts and integrated circuits on a board to achieve the most computing power. The synergy of these two men's talents led to the significant innovations of that company.

In embodiments, the right combination for each type of feature for a group EC may be learned using data from past successful companies, by applying machine learning technology to the data. The combination might not be linear.

A. Team Member Profiles

Figure 22:
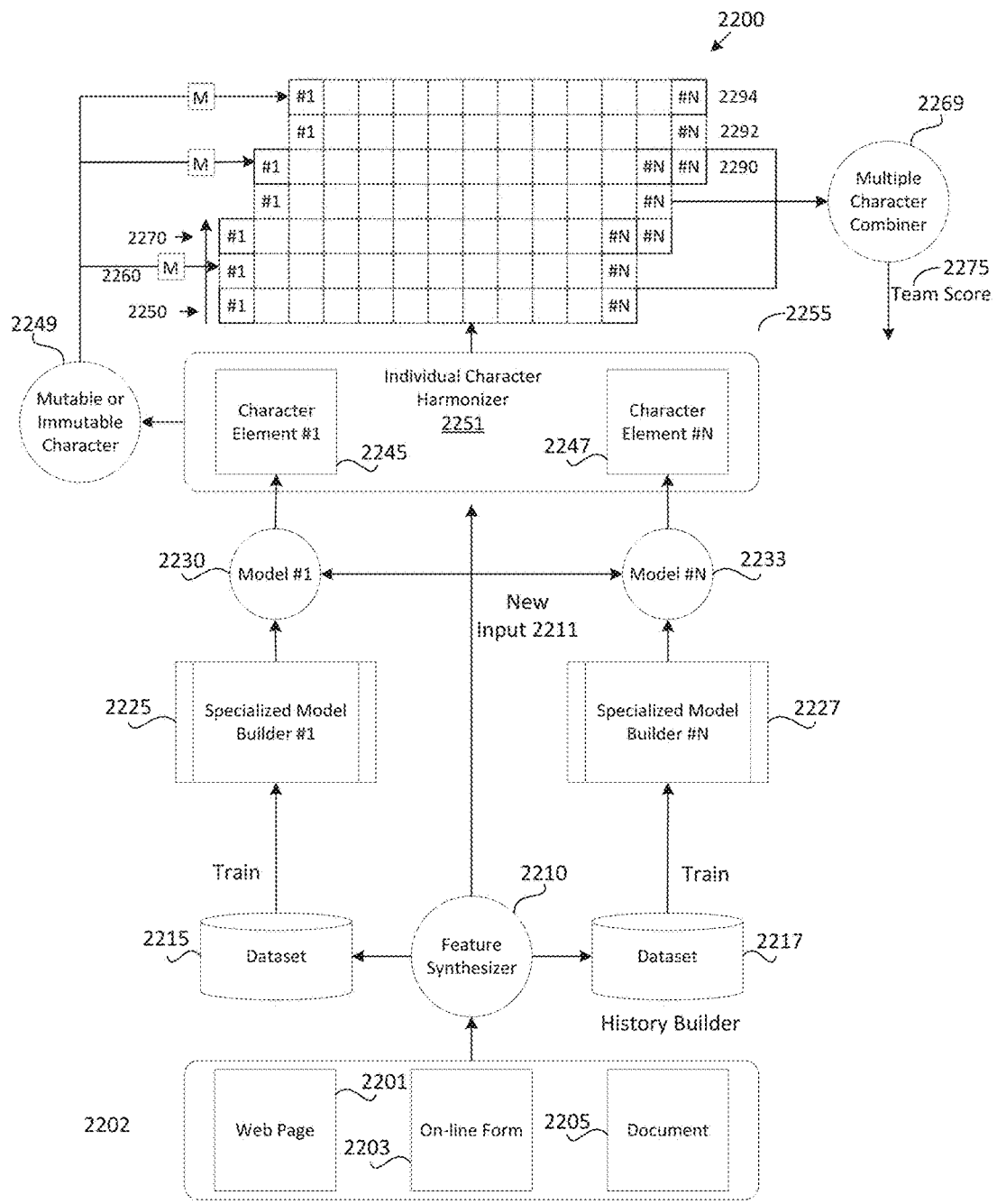
FIG. 22 illustrates a system for combining individual character profiles of individual team members into a team score for a company, in accordance with various embodiments.

FIG. 22 is a simplified conceptual diagram of a system and method for applying machine learning to objectively and systematically evaluate a team of individuals. We refer to a "team" in the general sense of a group of individuals who work together for a common purpose. More specifically, this disclosure uses a business, especially a start-up entity, as an example of a common purpose. This system infers an entrepreneurial character (EC) of an individual (team member), and a group of individuals working as a team, using disperse and heterogeneous sources of data. The system can be fully automated.

In FIG. 22, an example of a system 2200 is shown. The system comprises a set of software components executable on one or more processors. Preferably, the processors may be provisioned locally or in a scalable network of computers or processors, aka "the cloud." The system 2200 may be configured to input or receive data from data sources 2202. For example, data used can be extracted from web pages 2201, structured forms 2203, or documents 2205 in different formats (pdf, doc, etc.). Other data formats may include CSV, ARFF, JSON, etc. Data sources 2202 may be public, paid, or private domain. These examples of data sources are merely illustrative and not limiting. Details of collecting electronic data, for example, over a network, are known. In some cases, automated processes may be used to search the web and collect potentially useful data. The data preferably is collected over an extended period of time, at more or less regular intervals, although the frequency and number of data collections is not critical.

A feature synthesizer component 2210 may be arranged to process the received data from data sources 2202. Such processing may include identifying data fields, field types, and corresponding data values, etc. The feature synthesizer may determine which fields of data to import into a dataset, and which to ignore. The processing may include cleaning or "scrubbing" the data to remove errors or anomalies. In some cases, text analysis may be applied to text fields, for example, tokenizing, stop word processing, stemming, etc. to make the data more usable.

More importantly, feature synthesizer 2210, although illustrated as a single entity for simplicity, may actually comprise N individual feature synthesizer components. Thus, in FIG. 22, many elements above Data Sources 2202 are provided N times, in a structure designed to process in parallel 1 through N elements or attributes. Each individual feature synthesizer may be arranged to provide data, derived from the input data sources 2202, and store it in a corresponding Dataset 2215 for use with a corresponding specialized model builder 2225. The system may be initialized or configured for processing a given set of attributes of interest. One example, a set of 12 attributes (i.e., N=12 in this example) about team members that could be included in an entrepreneurial team member's profile, directed to background and experience data, are listed below.

In embodiments, a feature synthesizer for a given attribute may be configured to recognize, and extract from the input data, information that is indicative of the attribute of interest. It may then store the extracted data in the corresponding dataset 2215 through 2217. As discussed below, the process may be repeated periodically over time. To illustrate, a feature synthesizer directed to technology understanding, for example, might look for data on a person's education, technical degrees, patents, and work experience. It may collect what degrees were earned at what schools, and when. It might even look for grade reports or special awards or designations such as cum laude. It may evaluation technical publication in which the person was an author. All of this data may be collected into a dataset for the technology understanding attribute. As another example, a feature synthesizer for an attribute attention to detail may collect writings authored by the person on interest, and determine a frequency of misspellings or grammatical errors in those writings. Or, inconsistencies within the same writing may be an indicator of lack of attention to detail. Again, the corresponding feature synthesizer component gleans data relevant to its task from the input data sources and stores it in a dataset.

In embodiments, a dataset must also include an assessment or score for the particular attribute or variable of interest, at least for some of the records. In some cases, this evaluation may be conducted programmatically. In other cases, records may be evaluation by an expert with regard to the attribute of interest, and the evaluation results input to the dataset in association with the records reviewed. The evaluation may be expressed as a binary result (detail oriented or not detail oriented; high level of technical understanding, or not). In some embodiments, these evaluations may take the form of an analog value, say between 0 and 1.

Referring again to FIG. 22, a plurality (N) of specialized model builder components 225 through 2227 may be provided. Each model builder may be arranged to create a machine-usable model of the data in its dataset 2215 through 2217 (corresponding to attributes of interest 1 through N). For each attribute of interest 1 through N, some data in the corresponding dataset that includes an evaluation of the attribute of interest may be used to train the model. In this way, the model 2230 through 2233 may then be used to evaluate additional data in the corresponding dataset that does not include an explicit assessment of the attribute or variable of interest. The trained model can then predict that assessment and provide a score for the corresponding attribute. In FIG. 22, each score output from an individual model provides a corresponding character element 2245 through 2247. The character element scores 1-N together form an individual team member character vector or profile. As noted, in embodiments, Boolean or analog values may be used. Analog values preferably are normalized in Individual Character Normalizer 2251, and then the vector 2250 stored in memory. Details of building machine learning models such as classifiers are known. For example, see U.S. Pat. No. 9,269,054 to Francisco J. Martin, et al., incorporated herein by this reference.

Figure 23:
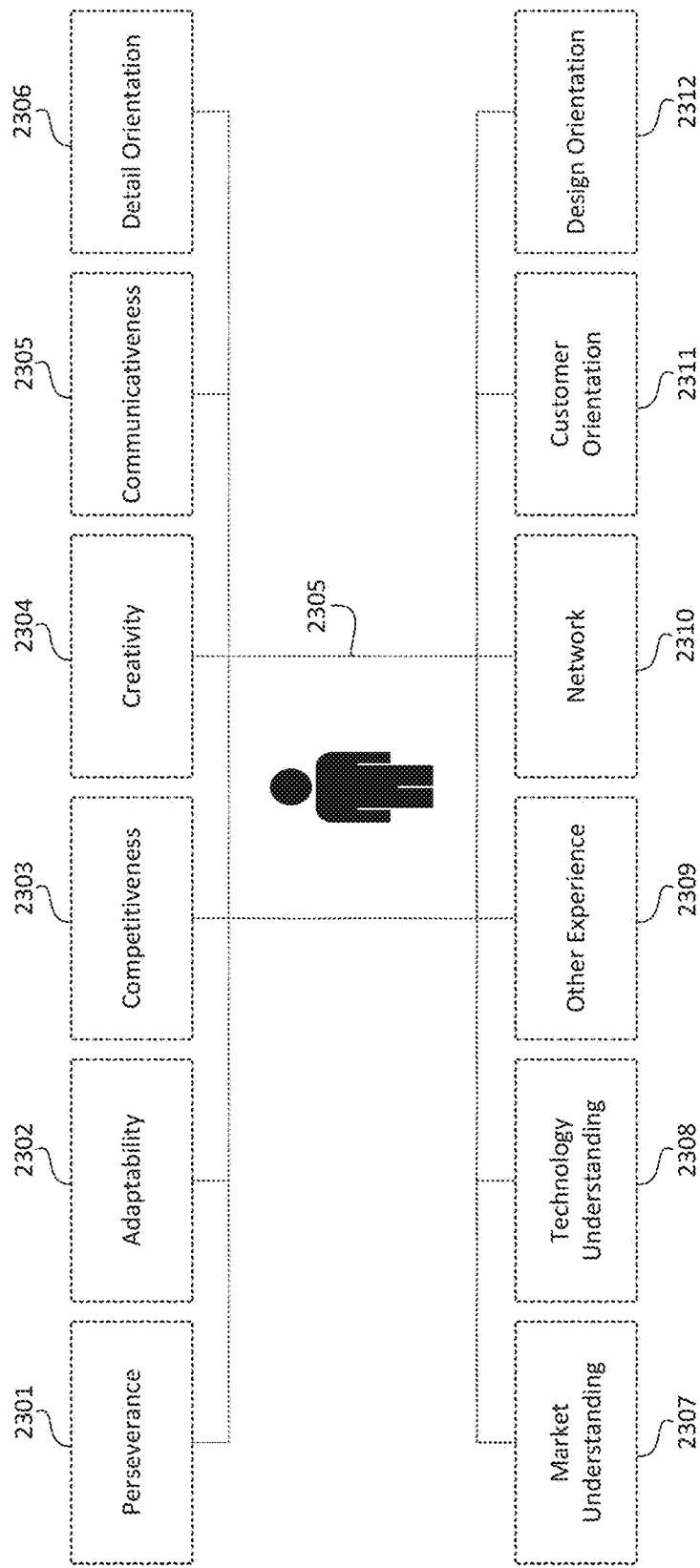
FIG. 23 illustrates an example set of attributes of an individual team member, in accordance with various embodiments.

Example types of information (attributes) about team members that could be included in an entrepreneurial team member's profile may include background and experience data, as follows (as shown in FIG. 23):

Perseverance 2301—Have they finished a long-term endeavor? (e.g. 5-year degree plus Ph.D.)
Adaptability 2302—Have they lived in more than one city, country, and for how long?
Competitiveness 2303—Have they won a significant prize or award? Involved in other competitive activities like sports?
Creativity 2304—Have they invented something special?
Communicativeness 2305—Have they presented at many conferences?
Detail Orientation 2306—Misspellings in the resume, paragraphs indented irregularly, etc.
Market Understanding 2307—How many years of experience do they have?
Technology Understanding 2308—Do they holds a tech degree? Do they have practical tech experience?
Other Experience 2309—Do they have business experience? Startup experience?
Network 2310—Number of connections? MBA?
Customer Orientation 2311—Have they held a sales role?
Design Orientation 2312—Have they attended design school? Do they have practical design experience?

In embodiments, other information that may be included in a profile might address character attributes such as "nonconformist?", "dissenter?", or "maverick?", or aggregate attributes such as "rebel" for the preceding distinct attributes. Suitable feature synthesizers can be configured to collect the data for model building.

In some systems, data may be collected for a mature organization, as distinguished from a startup. By "mature" is meant an entity that has reached an "outcome" indicative of success or failure (conveniently, a binary variable), or a "final state" as described above. Preferably, as noted above, such data may be collected from thousands of organizations so that it is statistically meaningful. Further, detailed information for each such entity may include attribute data for each team member in that entity, such as described herein, and as referred to above in FIG. 17. That data may be processed, and the actual outcomes included in appropriate datasets. This information may be used to further train or "tune" the attribute models by taking into account the eventual outcomes of actual companies.

Referring again to FIG. 22, in embodiments, a feature vector 2250 may be stored in a memory, the feature vector comprising a series of elements or fields numbered 1 to N for illustration, each element storing one or more values for a corresponding attribute or feature for an individual team member as discussed. In embodiments, it is not required that there be a value for every element in the vector. In some cases there may be insufficient data in the dataset for analysis. The number of features N is not critical; generally a greater number of features analyzed will tend to generate more reliable results. Tens of features may be sufficient, while hundreds may provide more accurate scoring, both for comparing individual team members, and for comparing aggregate team scores.

Figure 22B:
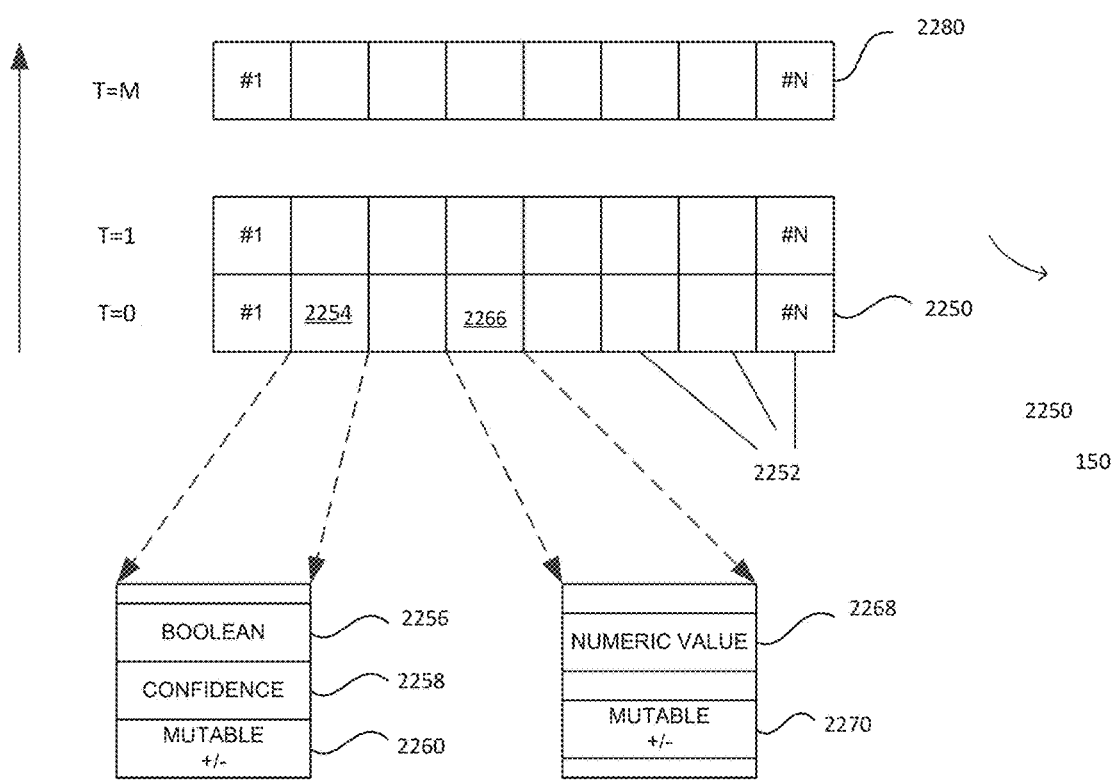
FIG. 22B illustrates details of a feature vector of the system of FIG. 22, in accordance with various embodiments.

FIG. 22B illustrates an example of a feature vector in more detail. The feature vector 2250 may comprise a plurality of individual character elements or features 2252, again numbered 1 through N. In some embodiments, each individual feature can be either of type Boolean (preferably with a confidence level associated), or of type Numeric. Feature field 2254 is expanded in FIG. 22B to show a Boolean field 2256, along with a corresponding confidence field 2258. In addition, feature 2254 may include a mutability field 2260. Preferably, mutability field 2260 comprises a pair of values: (1) a number that represents the level of mutability of the character and (2) a sign. These values may be respectively used to indicate to what extent the value associated with an individual feature is expected to change over time (mutability) and in which direction (positively or negatively). The level of mutability may conveniently be scaled, for example, to 0-1.

In other embodiments, mutability may be a single Boolean value (indicating mutable or not). For example, whether a person (team member) speaks English might take a Boolean value, or it may have a scaled value from 0 (not at all)

to 1 (fluent). Referring again to FIG. 22B, another feature 2266 is shown as expanded to illustrate a numeric field type 2268. In an embodiment, a numeric type of feature may have a value normalized within a certain scale. This feature (attribute) 2266 also may include a mutability value pair 2270 as just described.

Referring again to FIG. 22, the first character vector 2250 (shown at the bottom of the set of vectors) may be stored in memory, associated with a first time $t_1$. Before doing so, a determination of mutability may be made by a mutability component 2249, so that mutability data may be included in the character vector. At a later time $t_2$, additional data may be collected from data sources 2202, and processed by feature synthesizers 2210 for the same team member TM1. In embodiments, the new data may be processed by the same models 2230 through 2233, and a new feature vector formed, as before. The new feature vector may be added to memory, labeled as 2260. Subsequently, addition input data can be acquired and processed as described, at times $t_3$, $t_4$, etc. These data collections may be periodic or more random. Each of them is stored in memory, illustrated as vectors 2260 and 2270. The number is not critical.

In embodiments, the same process may be repeated for each team member, or any selected subset of a team. Thus, the feature synthesizer, as part of collecting raw data, will identify the other team members of interest, and collect data associated with each of them. Accordingly, a dataset may include records for each team member of interest, or separate datasets may be provisioned. Details of the data storage are a matter of design choice. In FIG. 22, a first set of vectors 150, 160 and 170 at times t1, t2, t3, respectively, are shown all for a first team member TM1. A second set of vectors may also be collected at different times for a second team member (TM2) (not labelled, but being the three middle vectors in the set of nine ($3^{rd}$ and 4th, as well as $6^{th}$ and $7^{th}$, overlapping) overlapping vectors in FIG. 22. The collection times t1, t2 etc. may or may not be the same for each team member. Finally, a third set of vectors illustrated at 2290, 2292, 2294 are shown for a third team member (TM3). All of this data may be input to a multiple character combiner component 2269 to develop a team score.

FIG. 23 is a simplified conceptual diagram illustrating examples of personal characteristics or attributes of an individual team member that, in embodiments, may be used in evaluation of the team member and the team. The attributes shown, as listed above, are merely illustrative and not limiting. Each of these (and other) attributes can be the target of a corresponding model, built from the datasets as described above or equivalent kinds of data. The example attributes listed are positive, that is, generally desirable attributes. Other data can be acquired and analyzed to consider generally negative attributes, say felony convictions or bankruptcy filings. This data too can be quantified, and the influence used to reduce overall team member scores. Both positive and negative attributes, i.e., a combination, can be analyzed in a system of the type disclosed.

B. Team Profiles

Figure 24:
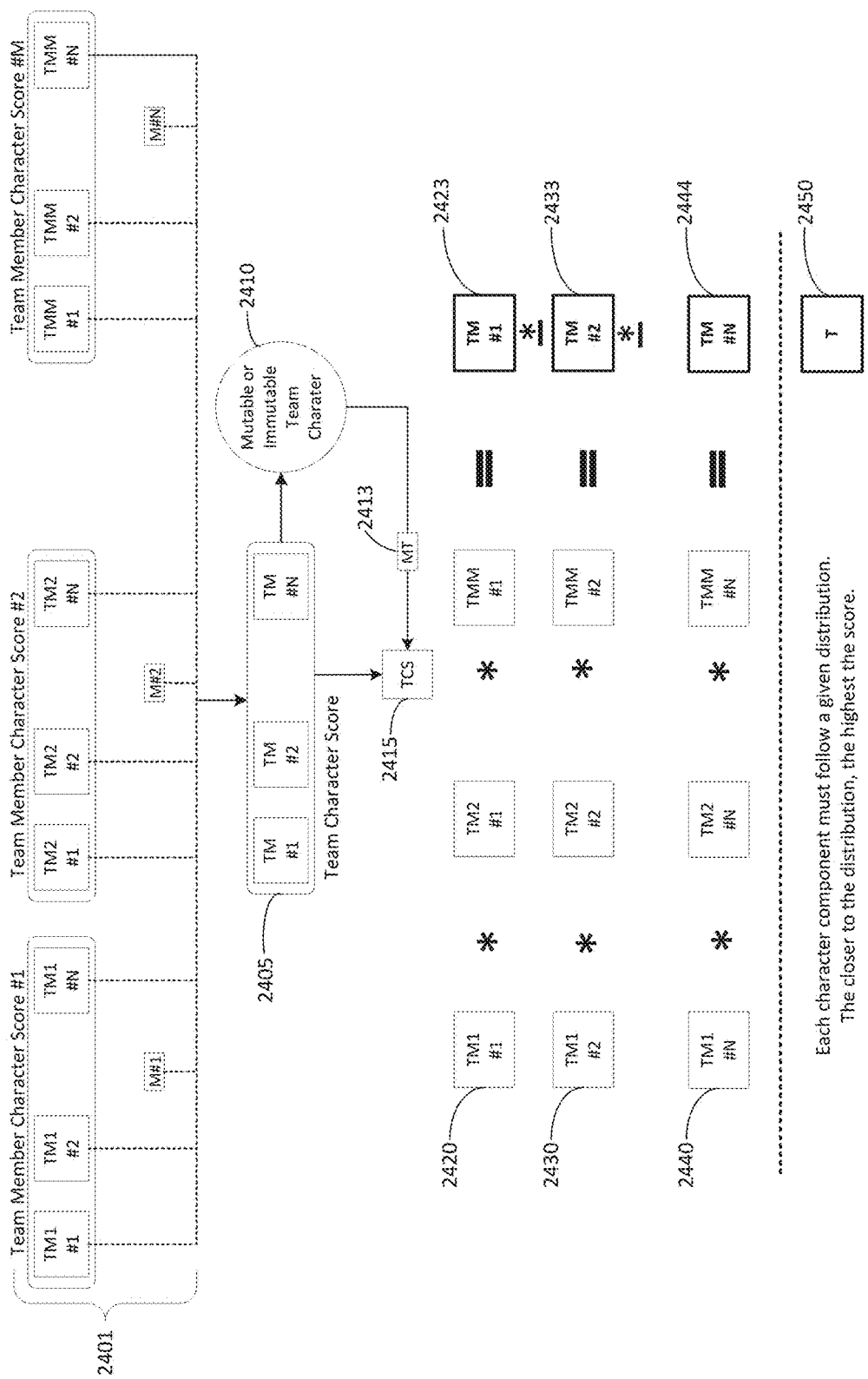
FIG. 24 illustrates combining individual team member profiles using formal mathematical rules, into an aggregate team profile, in accordance with various embodiments.

Referring to FIG. 24, in embodiments, individual team member profiles may be combined by formal mathematical rules into an aggregate profile for the team. FIG. 24 shows a simplified flow diagram illustrating a computer-implemented process for generating a team character score (aggregate or team profile) 2410 based on combining character scores across a plurality of individual team members. In embodiments, individual profiles may be cast as elements of an abstract algebraic structure (e.g. a group, ring, module, field, or vector space) in those cases where the profile and rules for combining them have sufficient structure. They could also be characterized and combined in a more ad hoc fashion. In FIG. 24, Team Member Character Score #1 may be combined with Team Member Character Scores #2 through #M to form the Team Character Score 2405. In embodiments, each individual team member score (i.e., #1, #2, . . . #M), may comprise a plurality of elements 1 through N. The team score may comprise a feature vector, as described above.

Each vector may correspond to a vector such as those described with regard to FIG. 22 for a given team member. For example, the vectors for each team member 1 through M shown in FIG. 24 may correspond to vectors 2250, 2270 and 2290 in FIG. 22, each associated with a different team member. For each vector, an aggregate score may be determined by combining the individual attribute values in the corresponding vector. In embodiments, the aggregate scores may be determined by any suitable operation such as arithmetic sum, mean value, etc. Operations may be applied to combine numeric as well as Boolean values. These aggregate scores for each team member can be used to compare or rank team members. A reporting component (not shown) can generate these results to a user interface or API.

An EC (character score) represents, and quantifies objectively, whether or to what extent an individual is appropriate to start or continue leading a company and if the character is predicted to evolve positively or negatively. More specifically, the mutability metrics, shown as M in FIG. 22, and for the team as MT 2413 in FIG. 24, may be acquired and analyzed over time in the vectors from T=0 to T=M. With these metrics, average values, rates of change, and other statistical measures can be used to assess and predict where each attribute is moving for those that are mutable. Increasing values of a positive attribute may be contribute to a higher overall team member score, and to a higher team score 2405.

In embodiments, a combiner used to compute the overall EC of an a team "TCS" 2415 may be adapted to reflect the type of company the team will operate. The same applies to other attributes about a company (market, stage, funding, etc), as described above. In embodiments, a combiner for an individual EC or team EC may be a combination of combiners.

Distribution of Character Components

Some character components or attributes are generally positive for every individual in which they are found, for example, hard working or well educated, and they remain positive when these attributes are found from the input data to exist across multiple members of a team. In a sense, they may be considered additive contributions to the overall team score. In some cases, attributes such at assertiveness, strong leader, authoritarian may be positive for an individual, but may not be positive where found in multiple members on the same team. For this reason, our system may implement a paradigm or preferred distribution for each character component. For some attributes, a very small number of instances (team members) may be preferred. For other attributes, the more team members that exhibit the attribute, the better for overall team function. To that end, we create a preferred distribution for each character component. Then the process assesses how closely the distribution for a given attribute matches the preferred distribution. Mathematically, this can be done in various ways, for example, summing the differences between the actual distribution and the preferred distribution, or using a sum of squares, etc. In some embodiments, correlation coefficients may be used to assess this "closeness" or deviation from the preferred distribution.

FIG. 24 also shows (bottom drawing) a simplified conceptual diagram illustrating a computer-implemented process for generating an overall team score based on combining team member character components and assessing the combined team member character components based on corresponding predetermined character component distribution data for each component. For example, in FIG. 24, a first row of elements 2420 may comprise the attribute values for an selected attribute #1 across all M team members, that is TM1 value #1 through TMM value #1. In embodiments, these values may be combined by applying a selected operator (indicated by the asterisk), to form an overall score 2423 for the team for that attribute #1. In the second row 2430, the element values may be collected for a second attribute #2, again for all M team members. A second operator (indicated by the asterisk) may be applied to this data to form the team result 24233. Similarly, additional operators may be applied for each element or attribute, across all team members, finally determining the last team attribute TM #N 2444.

The various operators may be selected according to the specific attribute of interest. To illustrate, if the team is going to work together in the English language, it would be important for all members of the team to speak English. Here, we will use English language skill for attribute #1, and assume it is a Boolean variable. Thus we apply the Boolean NAND operator for the operator in row 2420 so that the team result at 2423 will be true (Boolean 1) only if all team members speak English.

As another example, suppose the team is going to build a web application for consumers to use. It would be important for at least one team member to be skilled at user building user interfaces (UX). Here, we will use UX skill for attribute #2, and again assume it is a Boolean variable (the skill is present or it is absent in each team member, as ascertained from the input data by a corresponding feature synthesizer and model. Assuming that one person skilled in UX is enough, we apply the Boolean OR as operator, to determine the team result 2433. If one or more team members have that UX skill, it will result in the result 2433 true.

Suppose that attribute #N is "strong leader and authoritarian." It would be helpful to have exactly one person on the team with that attribute. Again, for now, we assume it is a Boolean variable. For the operator in row 2440 we apply the Boolean XOR operator across the team members. If there is one team member with that attribute, the output at 2444 will be true. In general, Boolean logic can be applied to realize any desired composition of the team. Further, compound expressions can be used in forming the team values for a given attribute. A compound expression here refers to a Boolean operation where at least one of the operands is itself a Boolean function of the team members data.

The results at 2423, 2433 and 2444, that is the Boolean output for the team for each attribute, together form a team profile—a vector of Boolean values. The number of "ones" can be counted to form a team score 2450. This score will improve in proportion to the number of elements or attributes for which the team "fits" the preferred distribution. This score can be used to compare teams or subsets of team quite readily. Different sets of attributes can be used by creating a desired or paradigm distribution and processing the data with correspondingly selected operators. Comparison of the team's resulting profile to the paradigm distribution will immediately identify where the team misses the mark. As explained above, some attributes are not simply input data from the input data sources. Rather, some attributes must be inferred, or estimated, by the feature synthesizer and model building processes described above.

Figure 25:
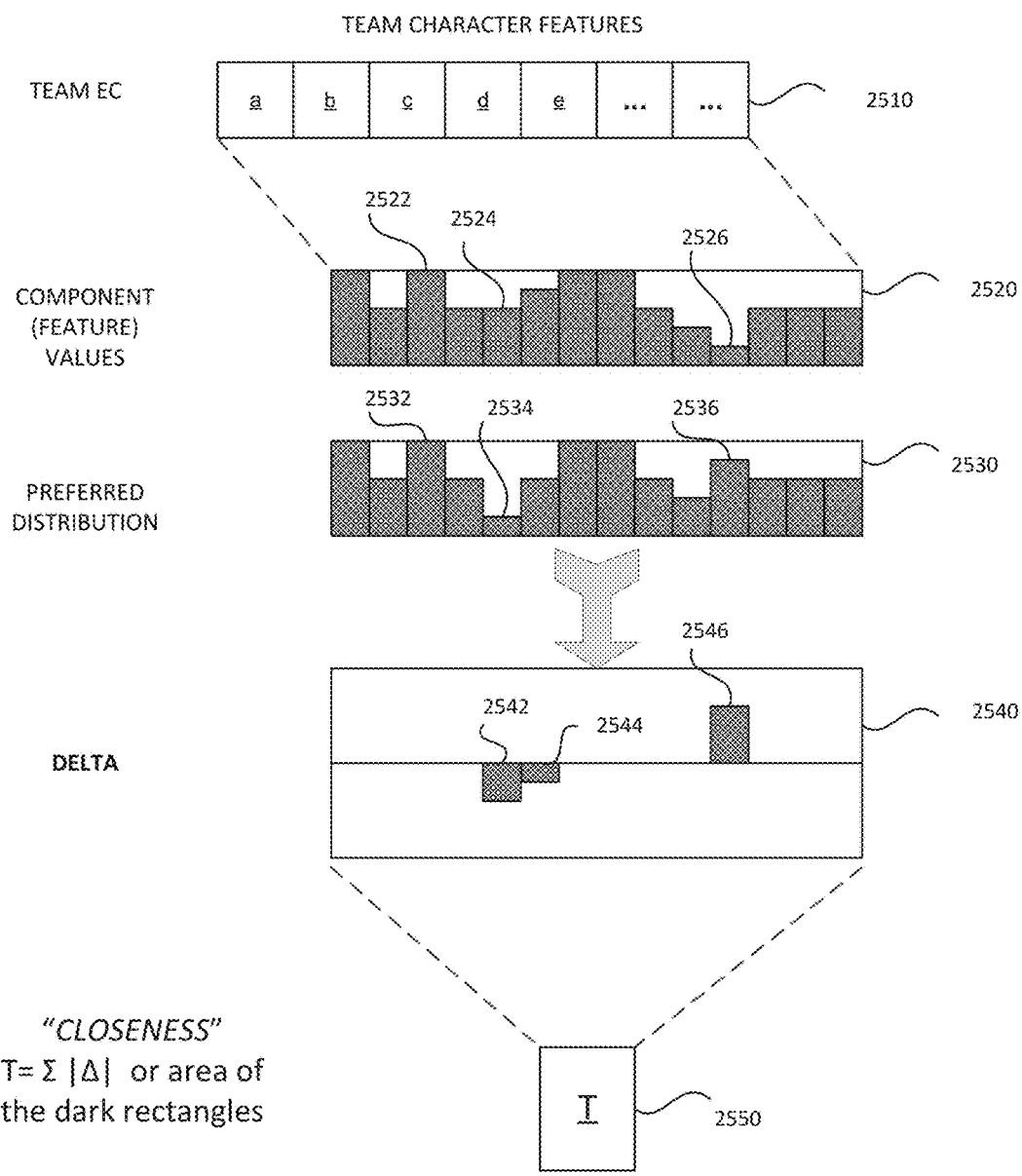
FIG. 25 illustrates analysis of a team profile relative to a preferred distribution, in accordance with various embodiments.

Several examples of Boolean attributes have been discussed above. Other attributes, or some of the same attributes, may have numeric values, for example, in a range of 0 to 1. For example, English language proficiency or UX programming skills can be assessed on a numeric scale. A team can be evaluated using these metrics as well. FIG. 25 is a simplified conceptual diagram illustrating analysis of a team profile relative to a preferred numeric distribution. Here, numeric values are scaled and quantized from 0 to 1. A team EC (profile) 2510 shows values (from 0 to 1) for each attribute a, b, c etc. For example, if an attribute of interest is years of formal education, the average or median number of years of education across the team members can be scaled and indicated in a vector. Other attributes like language skills can be used as well as numeric data types. The team attribute values may be collected in a vector 2520, where we illustrate the values graphically like a histogram. A preferred or paradigm distribution for the same set of attributes can be provided, shown as histogram 2530. The preferred distribution may be generated by analysis of a large collection of data, for example, that reflects startup entities' teams and their success or failure several years after they started. The team vector 2520 may be compared to the preferred distribution vector 2530. Here, we see that attribute 522, for example, in the team vector 2520 has the same value as the corresponding value 2532 in the preferred distribution 2530. The attribute 2524 in the team vector has a lower value 2534 in the preferred distribution 2530. The attribute with value 2526 has a higher value 2536 in the preferred distribution, etc. These differences or "delta" are illustrated as a delta histogram 2540. The closeness or "fit" of the team vector 2520 to the preferred distribution 2530 can be quantified by the delta data. In an embodiment, an area of the rectangles 2542, 2544, and 2546 can be calculated to determine a team score 2550.

In embodiments, the team score can be used for comparison to other teams. Importantly, the delta data can quickly identify where the team attributes depart from the preferred values. Further, the size of those departures can be reported to help to build a better team.

In viewing and using these metrics, the mutability values discussed above may be taken into consideration. Where a team score is relatively low, but the attributes that contribute to lowering the score are mutable in a positive direction, the score may improve over time. On the other hand, where the mutability values are low or negative, improvement over time is less likely.

Figure 26:
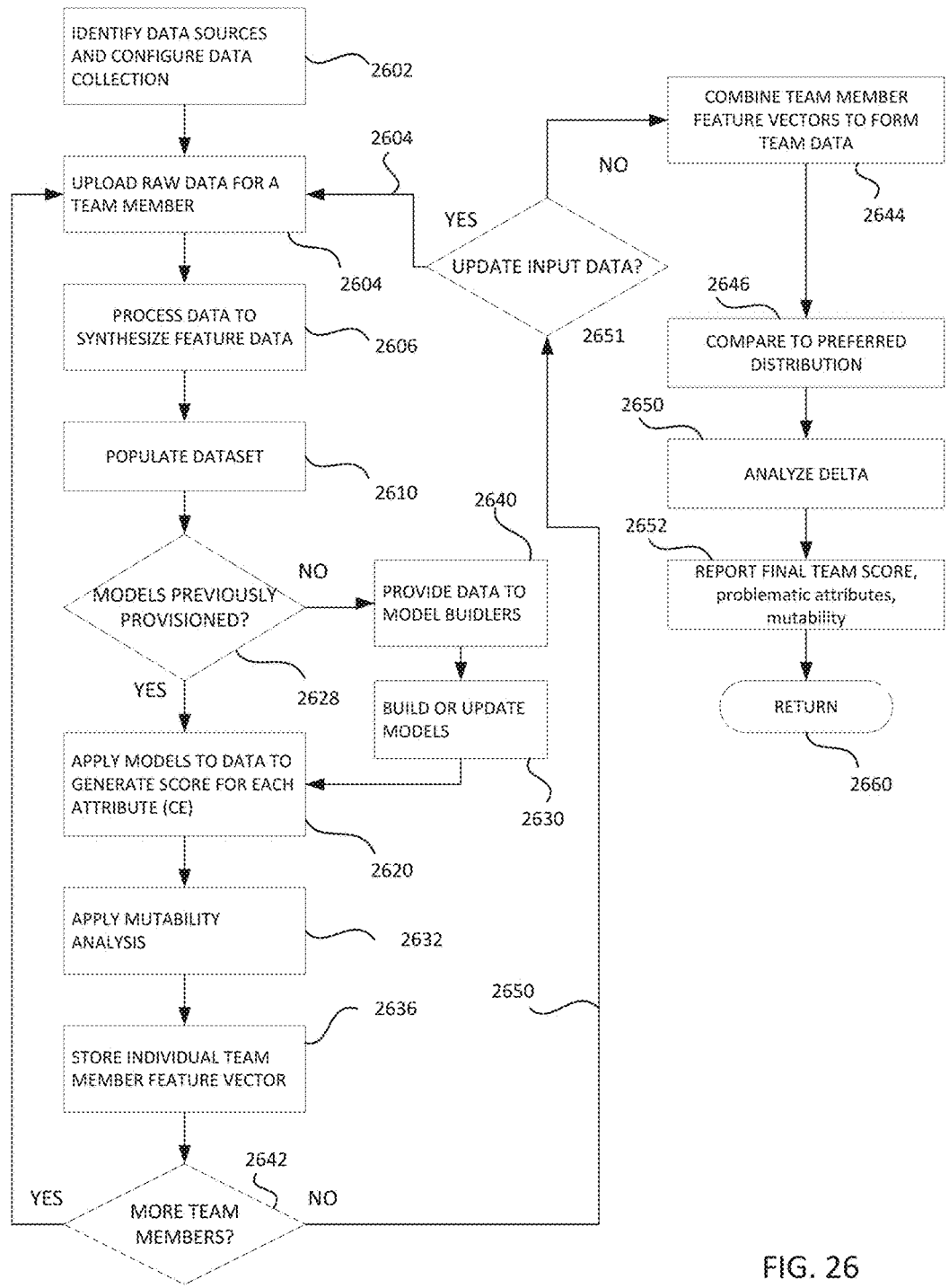
FIG. 26 illustrates the operational flow of a process to generate a team score, in accordance with various embodiments.

FIG. 26 is a simplified flow diagram that summarizes the processes described above in one embodiment. Identify data sources and configure data collection, block 2602. Refer to sources 2202 in FIG. 22, for example. Upload raw data for a team member, block 2604. Process the data to synthesize feature data, block 2606. Use the feature data to populate a dataset, block 2610. The dataset may correspond to a dataset 2215 in FIG. 22. If prediction models were previously provisioned at 2628, apply the models to the dataset to generate a score for each attribute or character element for the current team member, block 2620. If such models have not been provisioned, decision 2628, then provide the data to a specialized model builder for each attribute, block 2640 to then generate or update the models, block 2630, and then apply them, block 2620.

Referring further to FIG. 26, apply a mutability analysis to add mutability metrics to the data, 2632. For some cases, the mutability may be predetermined. For example, a date of birth or bachelor degree grant are immutable. A language skill may improve over time. In some embodiments mutability may be inferred by changes in the team member data over time, as data is collected repeatedly over time (see decision 2642 and FIG. 22). Store the team member feature vector in memory, block 2636. If there are more members not yet processed, decision 2642, loop back to 2604 to collect data for the next team member. After all team members are processed, i.e., a No at decision block 2642, proceed on path 2650 to a decision 2651 as to whether to update the input data. In some embodiments, the input data may be updated periodically or according to some other schedule. If an update is indicated, continue to block 2604 to repeat the foregoing steps and acquire new data for each team member.

Otherwise, proceed to block 2644 to combine team member feature vectors to form a team (aggregate) feature vector. Next, compare the team vector to a preferred distribution or composition, block 2646. The differences between the team vector and the preferred composition may be assessed, block 2650, which may include generating an overall team score for ready comparison to other teams. Finally, results reporting at block 2652 may include final team score, problematic attributes, mutability assessment, and other metrics which can be used to predict success of the team, and to improve its composition. Process flow terminates at block 2660.

Figure 27:
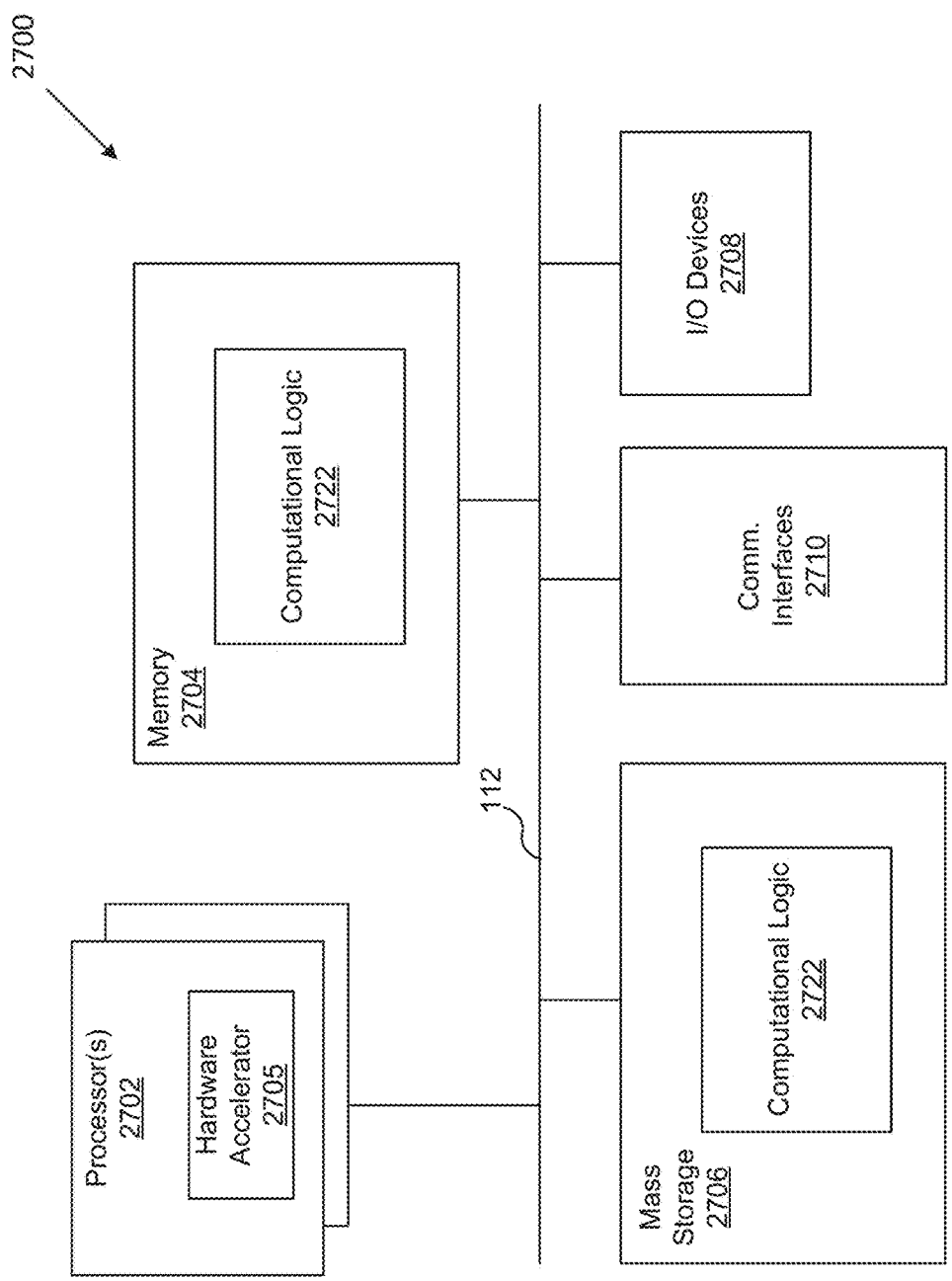
FIG. 27 illustrates a block diagram of a computer device suitable for practicing the present disclosure, in accordance with various embodiments.

Referring now to FIG. 27, wherein a block diagram of a computer device suitable for practicing the present disclosure, in accordance with various embodiments, is illustrated. As shown, computer device 2700 may include one or more processors 2702, memory controller 2703, and system memory 2704. Each processor 2702 may include one or more processor cores and/or hardware accelerator 2705. An example of hardware accelerator 2705 may include, but is not limited to, programmed field programmable gate arrays (FPGA). Memory controller 2703 may be any one of a number of memory controllers known in the art. System memory 2704 may include any known volatile or non-volatile memory.

Additionally, computer device 2700 may include mass storage device(s) 2706 (such as solid state drives), input/output device interface 2708 (to interface with various input/output devices, such as, mouse, cursor control, display device (including touch sensitive screen), and so forth) and communication interfaces 2710 (such as network interface cards, modems and so forth). In embodiments, communication interfaces 2710 may support wired or wireless communication, including near field communication. The elements may be coupled to each other via system bus 2712, which may represent one or more buses. In the case of multiple buses, they may be bridged by one or more bus bridges (not shown).

Each of these elements may perform its conventional functions known in the art. In particular, system memory 2704 and mass storage device(s) 2706 may be employed to store a working copy and a permanent copy of the executable code of the programming instructions of an operating system, and one or more applications, collectively referred to as computing logic 2722. The programming instructions may comprise assembler instructions supported by processor(s) 2702 or high-level languages, such as, for example, C, that can be compiled into such instructions. In embodiments, some of computing logic may be implemented in hardware accelerator 2705.

The permanent copy of the executable code of the programming instructions or the bit streams for configuring hardware accelerator 2705 may be placed into permanent mass storage device(s) 2706 in the factory, or in the field, through, for example, a distribution medium (not shown), such as a compact disc (CD), or through communication interface 2710 (from a distribution server (not shown)).

The number, capability and/or capacity of these elements 2710-2712 may vary, depending on the intended use of example computer device 2700, e.g., whether example computer device 2700 is a smartphone, tablet, ultrabook, a laptop, a server, a set-top box, a game console, a camera, and so forth. The constitutions of these elements 2710-2712 are otherwise known, and accordingly will not be further described.

Figure 28:
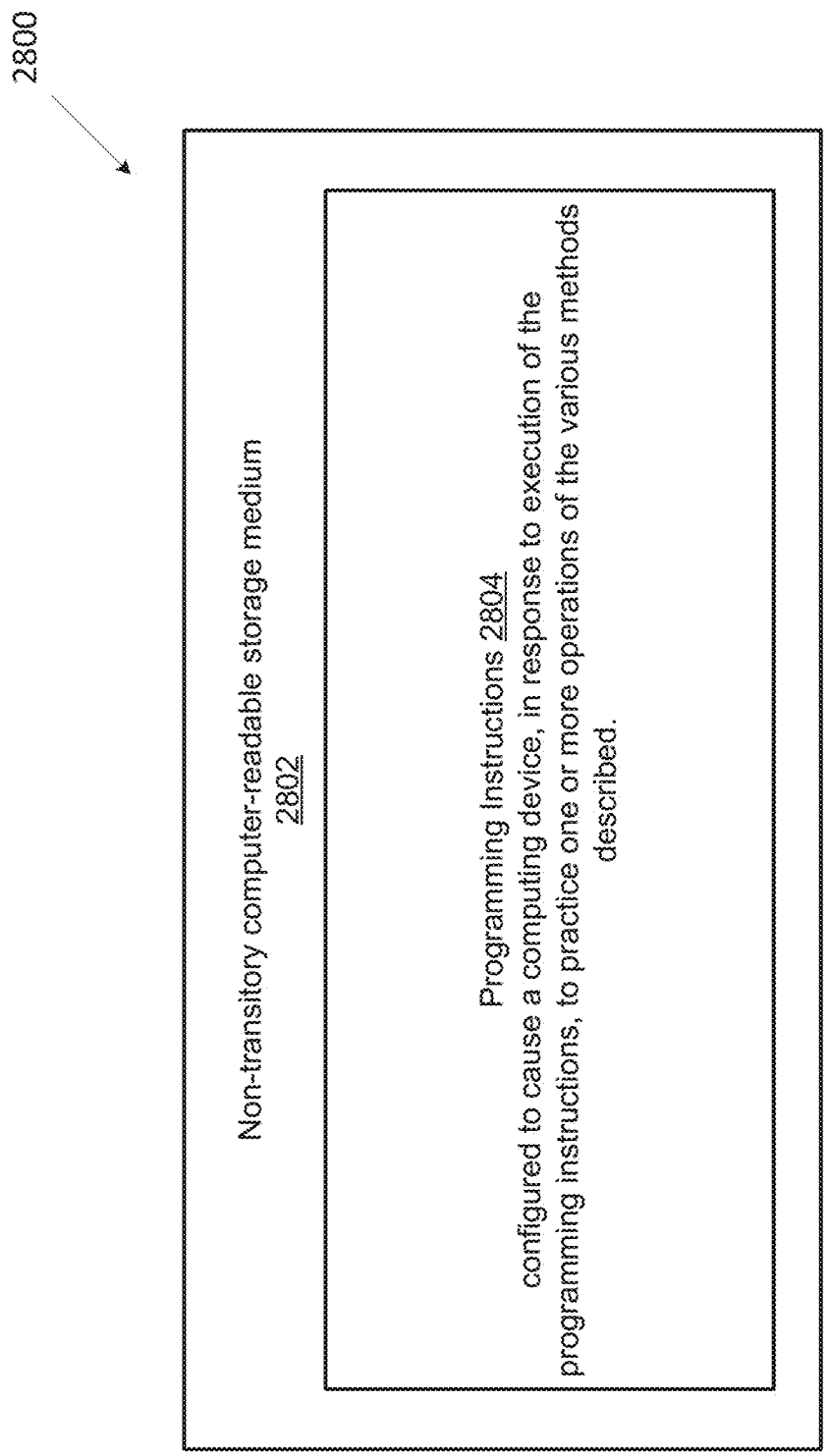
FIG. 28 illustrates an example computer-readable storage medium having instructions configured to practice aspects of the processes of the present disclosure, in accordance with various embodiments.

FIG. 28 illustrates an example computer-readable storage medium having instructions configured to implement all (or portion of) the system of FIG. 3, or the software environment shown in FIGS. 4-21, and/or practice (aspects of) the processes of, or referred to in, FIGS. 3-25, respectively, earlier described, in accordance with various embodiments. As illustrated, computer-readable storage medium 2802 may include the executable code of a number of programming instructions or bit streams 2804. Executable code of programming instructions (or bit streams) 2804 may be configured to enable a device, e.g., computer device 2700, in response to execution of the executable code/programming instructions (or operation of an encoded hardware accelerator 2705), to perform (aspects of) the processes of, illustrated within, or referred to in FIGS. 3-25, respectively. In alternate embodiments, executable code/programming instructions/bit streams 2804 may be disposed on multiple non-transitory computer-readable storage medium 2802 instead. In embodiments, computer-readable storage medium 2802 may be non-transitory. In still other embodiments, executable code/programming instructions 2804 may be encoded in transitory computer readable medium, such as signals.

Referring back to FIG. 27, for one embodiment, at least one of processors 2702 may be packaged together with a computer-readable storage medium having some or all of computing logic 2722 (in lieu of storing in system memory 2704 and/or mass storage device 2706) configured to practice all or selected ones of the operations earlier described with references to FIGS. 3-25. For one embodiment, at least one of processors 2702 may be packaged together with a computer-readable storage medium having some or all of computing logic 2722 to form a System in Package (SiP). For one embodiment, at least one of processors 2702 may be integrated on the same die with a computer-readable storage medium having some or all of computing logic 2722. For one embodiment, at least one of processors 2702 may be packaged together with a computer-readable storage medium having some or all of computing logic 2722 to form a System on Chip (SoC). For at least one embodiment, the SoC may be utilized in, e.g., but not limited to, a hybrid computing tablet/laptop.

One of skill in the art will recognize that the concepts taught herein can be tailored to a particular application in many other ways. In particular, those skilled in the art will recognize that the illustrated examples are but one of many alternative implementations that will become apparent upon reading this disclosure. It will be obvious to those having skill in the art that many changes may be made to the details of the above-described embodiments without departing from the underlying principles of the invention. The scope of the present invention should, therefore, be determined only by the following claims.

Where the disclosure recites "a" or "a first" element or the equivalent thereof, such disclosure includes one or more such elements, neither requiring nor excluding two or more such elements. Further, ordinal indicators (e.g., first, second or third) for identified elements are used to distinguish between the elements, and do not indicate or imply a required or limited number of such elements, nor do they indicate a particular position or order of such elements unless otherwise specifically stated.

What is claimed:

1. A method for predicting the outcome of a business entity, comprising:
   receiving explicit data reporting or indicating activities of the business entity;
   receiving other data from which information regarding the activities or level of operations of the business entity may be inferred; and
   using a data processor:
   generating inferred data regarding the business entity from a selected portion of the other data;
   using at least some of the explicit data and some of the inferred data, determining which one of a series of defined sequential active states of development that the business entity is currently in;
   using the result of the determination as the current state of the business entity, predicting a final stage of the business entity, and a probability of evolving to that final stage from the current state, by operating on at least some of the explicit data and some of the inferred data;
   outputting the determined active state of the business entity, the predicted final stage, and the probability, to a user; and
   calculating a confidence score as to the determined active state of development, and if the score is below a defined threshold:
   repeating the determination to choose a second possible state for the business entity;
   predicting a second final state and a second probability of evolving to the second final state; and
   outputting the second final state and the second probability to the user.

2. The method of claim 1, wherein at least one of:
   the series of defined sequential active states of development are inferred using Complex Hidden Markov Models; or
   the series of defined sequential active states of development are inferred using Complex Hidden Markov Models, and the series of defined sequential active states are specific to the business entity.

3. The method of claim 1, wherein determining which one of a series of defined sequential active states of development that the business entity is currently in, and predicting a final stage of the business entity includes comparing the explicit data and at least some of the inferred data to analogous explicit data and inferred data in a database comprising a set of inferred lifecycles for business entities.

4. The method of claim 3, wherein at least one of:
   the explicit data and the other data is extracted and processed to generate two types of dimensions: Slowly Changing Dimensions (SCDs) and Fast Changing Dimensions (FCDs), and wherein each dimension is represented by sequences of complex events; or
   the explicit data and the other data is extracted and processed to generate two types of dimensions: SCDs and FCDs, and each dimension is represented by sequences of complex events, and a lifecycle of the business entity is inferred, at least in part, based on a comparison of its SCDs to those of other business entities in the database.

5. One or more non-transitory computer-readable storage media comprising a plurality of instructions that in response to being executed cause a computing device to:
   receive explicit data reporting or indicating activities of a business entity;
   receive other data from which information regarding the activities or level of operations of the business entity may be inferred;
   generate inferred data regarding the business entity from a selected portion of the other data;
   using at least some of the explicit data and some of the inferred data, determine which one of a series of defined sequential active states of development that the business entity is currently in;
   using the result of the determination as the current state of the business entity, predict a final stage of the business entity, and a probability of evolving to that final stage from the current state, by operating on at least some of the explicit data and some of the inferred data;
   output the determined active state of the business entity, the predicted final stage, and the probability, to a user;
   calculate a confidence score as to the determined active state of development, and
   if the score is below a defined threshold:
   repeat the determination to choose a second possible state for the business entity;
   predict a second final state and a second probability of evolving to the second final state; and
   output the second final state and the second probability to the user.

6. The one or more non-transitory computer-readable storage media of claim 5, wherein at least one of:
   the series of defined sequential active states of development are inferred using Complex Hidden Markov Models; or
   the series of defined sequential active states are specific to the business entity.

7. The one or more non-transitory computer-readable storage media of claim 5, wherein at least one of:
   determining which one of a series of defined sequential active states of development that the business entity is currently in, and predicting a final stage of the business entity includes comparing the explicit data and at least some of the inferred data to analogous explicit data and inferred data in a database comprising a set of inferred lifecycles for business entities; or
   determining which one of a series of defined sequential active states of development that the business entity is currently in, and predicting a final stage of the business entity includes comparing the explicit data and at least some of the inferred data to analogous explicit data and inferred data in a database comprising a set of inferred lifecycles for business entities, and the explicit data and the other data is extracted and processed to generate two types of dimensions: Slowly Changing Dimensions (SCDs) and Fast Changing Dimensions (FCDs), wherein each dimension is represented by sequences of complex events.

* * * * *